Figure 1:
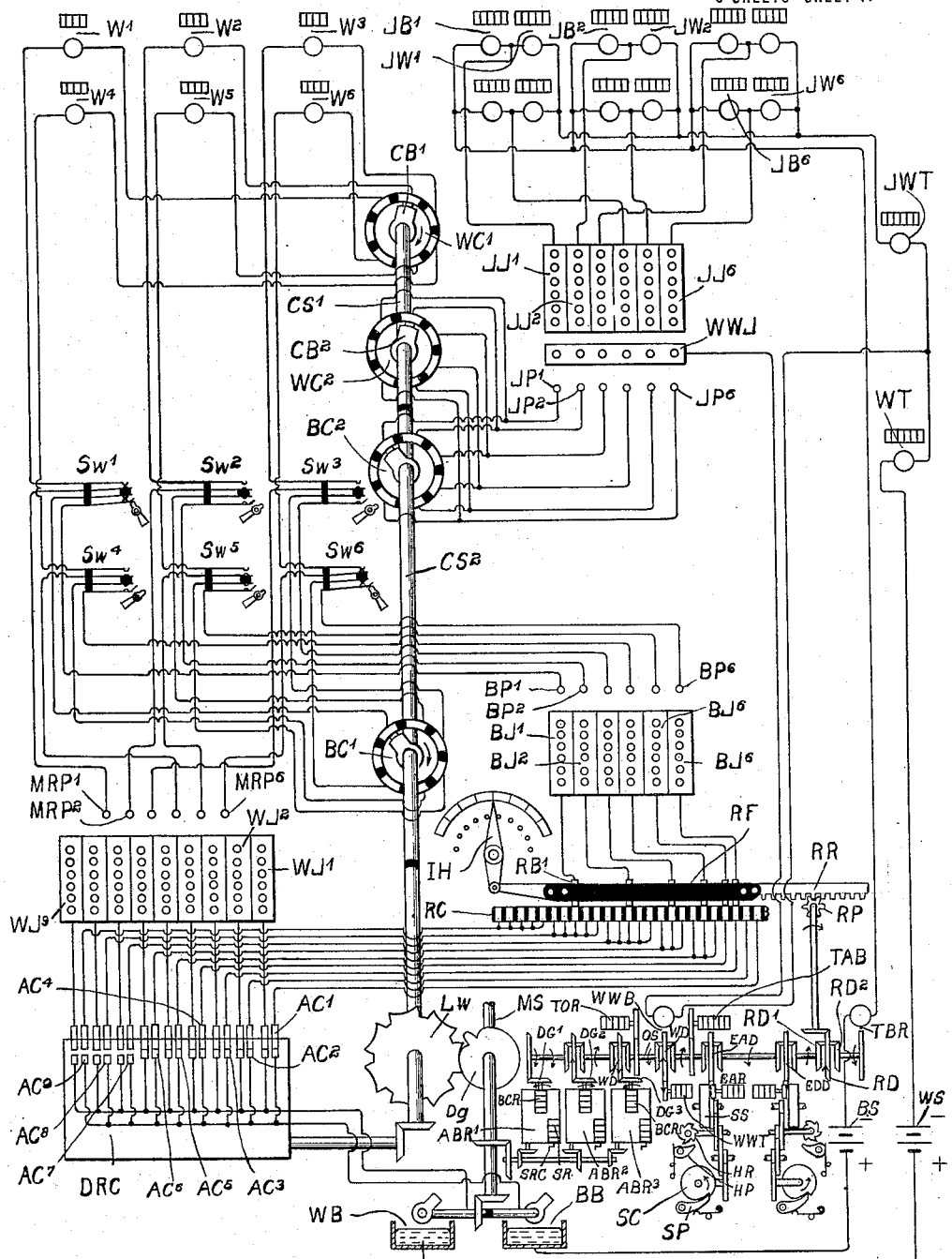

F. O. HEUSER.
ACCOUNTING SYSTEM.
APPLICATION FILED JAN. 3, 1910. RENEWED JULY 1, 1915.

1,175,059.
Patented Mar. 14, 1916.
6 SHEETS—SHEET 5.

Witnesses
Albert G. McCaleb
Leonard C. Bogue

Inventor
Frederick O. Heuser
By Browne Williams
Attorneys

F. O. HEUSER.
ACCOUNTING SYSTEM.
APPLICATION FILED JAN. 3, 1910. RENEWED JULY 1, 1915.
1,175,059.
Patented Mar. 14, 1916.
6 SHEETS—SHEET 6.
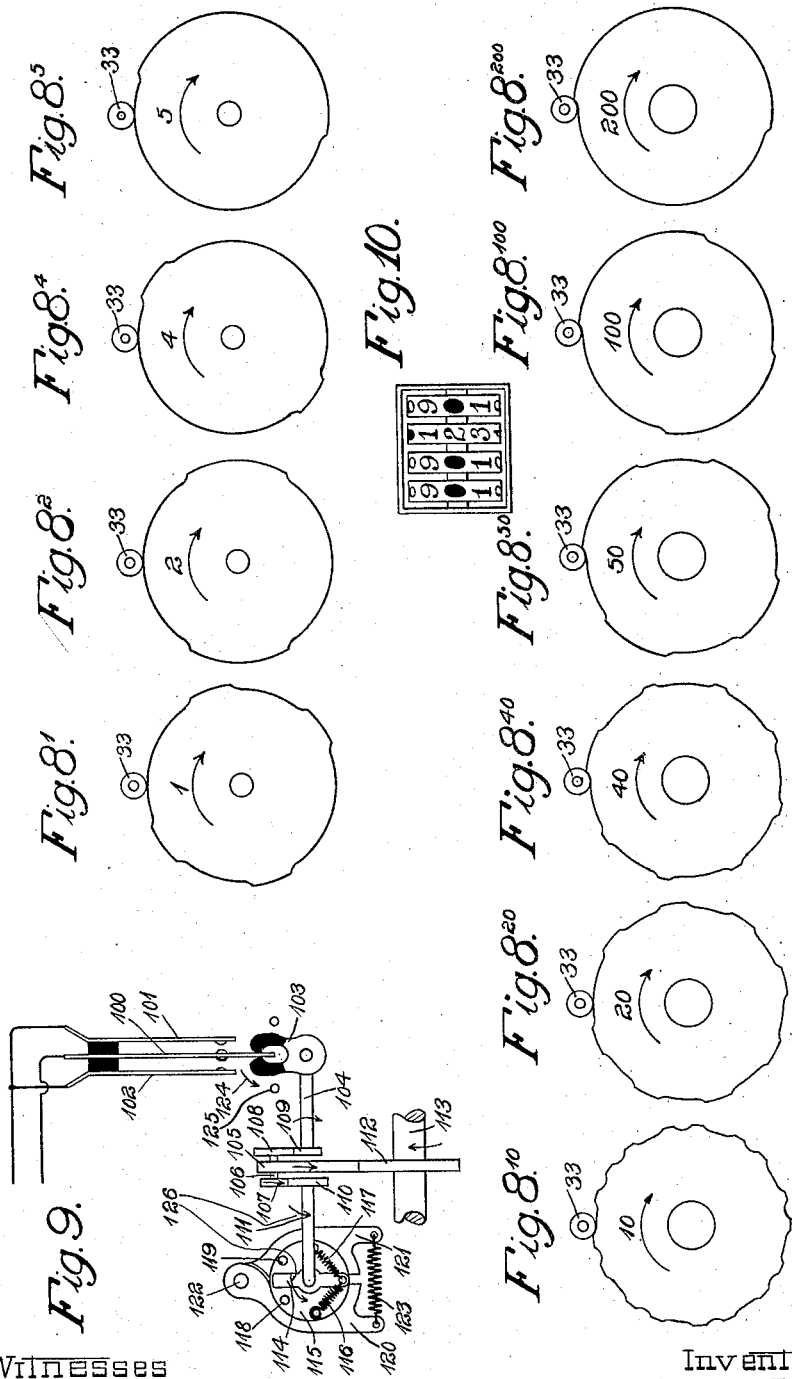

UNITED STATES PATENT OFFICE.

FREDERICK O. HEUSER, OF CHICAGO, ILLINOIS, ASSIGNOR, BY MESNE ASSIGNMENTS, TO WILLIAM R. HEATH, OF BUFFALO, NEW YORK.

ACCOUNTING SYSTEM.

1,175,059.  Specification of Letters Patent.  Patented Mar. 14, 1916.

Application filed January 3, 1910, Serial No. 536,119. Renewed July 1, 1915. Serial No. 37,592.

*To all whom it may concern:*

Be it known that I, FREDERICK O. HEUSER, a citizen of the United States, residing at Chicago, in the county of Cook and State of Illinois, have invented certain new and useful Improvements in Accounting Systems, of which the following is a full, clear, concise, and exact description, reference being had to the accompanying drawings, forming a part of this specification.

My present invention relates to accounting systems and is particularly concerned with automatic mechanism for calculating and indicating the production costs in a manufacturing plant. It relates not so much to the direct labor cost as to other elements of cost, such as the charges which should be made for work of machines and the overhead charges which should be apportioned among the various pieces of work or jobs in process.

In my earlier application, Serial No. 495,717, filed May 13, 1909, I have described and claimed an accounting system well adapted to calculate and indicate automatically the amount of each workman's time and wages, the apportionment of the workmen's wages between productive labor and waste or non-productive labor, the labor cost of each job, and in association with the means for showing the labor cost of each job, a means for adding the value of the material cost used in the various jobs, and means for showing various totals, sub-totals and differences which are valuable from an accountant's standpoint in showing the condition of the business in connection with which the system is employed.

My present invention is not only an improvement over the system shown and described in my said earlier application, but is an improvement also upon the invention described and claimed in the application of Charles H. Tallmadge, Serial No. 480,685, filed March 1, 1909. The said Tallmadge application discloses a system in which there is assigned to each job a job register adapted to indicate the direct labor cost of each job. Each workman is provided with a connecting plug with which connection may be established with any job register. Each of these plugs controls not only the operation of mechanism to account for the workman's wages, but controls also the operation of mechanism to account for the overhead charge or burden. There is assigned to each job not only a wage register but also a burden register and the burden and labor cost may be totalized for each job in a common register. The mechanism of this Tallmadge application may be set at a certain point corresponding with the estimated amount of the total burden for an accounting period, as, for example, a month. The burden may be made up of such items as rent, depreciation, insurance, power, superintendence, etc. If during the course of the month it be found that these items are greater or less than was anticipated, the setting of the mechanism may be changed accordingly. The burden-controlling mechanism having been set in this way, the operation of the system is such as to charge the various jobs with a burden cost at a rate corresponding exactly with the predetermined setting. Generally stated, this result is accomplished by automatic mechanism which, if the burden is not being distributed at the necessary rate, comes into play to adjust the rate at which the burden-actuating mechanism operates to bring the total distributed burden promptly into accord with the setting of the burden-controlling mechanism.

One of the most important improvements of my present invention over that of Tallmadge as above outlined is this: In the Tallmadge application there are no limits to the automatic variation of the burden rate mechanism whereas my application provides means for setting limits within which the burden-actuating mechanism may be automatically regulated. This feature is of importance and should be explained more fully. Assume a factory in which normally 100 hands are employed. Each of these workmen has a certain rate of wages and each job should be charged with the total of the wages of the men at work upon that job. In accordance with one of the best accounting methods of the past, a certain burden rate has been assigned to each workman, and the job upon which each workman puts his time is charged not only with his direct labor cost but with an additional item dependent upon the burden rate which has been assigned to the workman. In the methods of the past it has been a difficult and awkward matter to change the burden rates from time to time in order to make the burden cost as charged to jobs correspond with the actual burden as it really accrues. If the conditions of work and production were constant and uniform, it would be a matter of comparative simplicity to apportion the burden rates to the workmen and then raise or lower them all, one per cent. or five per cent. or seven per cent., as might be found necessary to make the total of the burden cost as charged to the jobs correspond with the accruing burden. When, however, it is considered that the conditions of production are not constant, but that many of them vary through wide limits, it will be seen that the difficulty of properly apportioning the burden is very greatly increased. The cost accounting methods heretofore in vogue have required so much clerical effort and so much delay in securing data and results that it has not been feasible to make a very scientific apportionment of burden or overhead charges. While the system of the Tallmadge application is a long step in advance of the cost accounting methods of the prior art in that the total of the distributed charges is made to correspond exactly and concurrently with the accruing burden, there is one important limitation in the Tallmadge system in that it is impossible to restrict the operation of the mechanism for adjusting the rate of each workman's burden to correspond with the total accruing burden. Thus, for example, if in the Tallmadge system only one man out of a normal 100 remained at work his burden rate would be automatically increased until it was equal to the entire accruing burden of the plant. While this might be scientifically justifiable, it is no doubt practically better to scale down the burden rate to be charged for such a single workman.

My invention provides automatic means for limiting the extent to which the burden rates assigned to the workmen may be increased above or decreased below the normal. In connection with this means for limiting the automatic adjustment of the burden. The storing of this excessive burden storing temporarily any undistributed burden. The storing of this excessive burden is wholly automatic and occurs whenever the upper limit of the automatic adjusting mechanism is passed. Not only does the storing mechanism act to absorb any excess of actual burden over and above that distributed, but when the condition, such as, for example, an increased number of men at work, become such as to warrant the distribution of the excess, the storing mechanism operates automatically to maintain a high burden distribution rate until the stored excess has been delivered in the form of distributed burden. In like manner an automatic storing mechanism is provided to be operated automatically whenever the amount of burden which is distributed exceeds the actual burden. This will occur when the automatic burden rate adjusting mechanism reaches its lower limit. Such an excess of distributed burden over and above the actual accruing burden might occur if a large additional force of men were placed temporarily at work. If, for any reason, it was deemed preferable not to reduce the burden rate to correspond with this excessive number of men, the lower limit of the burden rate controlling mechanism would be fixed to distribute the burden at a higher rate than would be strictly warranted by the large number of men at work. This mechanism for storing an excess of distributed burden in like manner operates to maintain the rates of burden distribution at a low level until the accumulation of excessive distributed burden is released.

A certain part of the total burden which is to be distributed can be estimated in advance with a very close approximation to accuracy. The burden due to rent, interest on investment, estimated depreciation, insurance, taxes, etc., is usually known in advance and the rate at which the burden must be distributed per day or per hour to equal these charges is susceptible to exact calculation. There are, however, other burden charges which cannot be so readily determined in advance. These might include, for example, the cost of heat, power, light, superintendence and repairs. My invention provides means for setting upon one scale a more or less fixed burden rate corresponding with the first mentioned list of items. Also a second mechanism which may be set at a rate to correspond with the second list of items, and as the actual cost of power is determined, the burden rate controlling mechanism may be adjusted to make up for or correct any error in the preliminary estimate of burden rate. As many burden rate controlling mechanisms may be employed as may be found convenient to take care of the various burden charges, either fixed or variable. My invention provides means for the distribution of the burden at a rate corresponding with the total set up upon all of these setting devices no matter how many there may be.

One of the more or less variable items of burden is that resulting from the idle time of workmen to whom wages must be paid. Another similar item which cannot be assigned directly to any specific job results from the irregular employment of roustabouts and extra general helpers of one kind or another, such men as are employed from time to time to clean up the factory yards, etc. The wages of these men may be charged against one or more general job accounts and may be distributed as are wages paid for idle time.

It is one of the features of my invention to provide means for automatically increasing the rate of burden distribution to correspond with the amount of wages thus paid to idle men or to roustabouts or others who are employed for a few hours or days and then upon work which does not contribute directly to some one of the specific jobs in process. In the preferred form of my invention this automatic distribution of the accruing burden is accomplished by means of a differential gear, one side of which is rotated by a series of mechanisms upon which are set up, as previously stated, the rates of the several accruing burdens, these rates being adjusted from time to time, if necessary, in order that there may be a correspondence between the rate of burden distribution and the rate of the real burden as found actually to accrue. The other side of this differential gear is operated by a mechanism driven at a rate corresponding with the total of the distributed burden. The common gear of this differential gear is connected with a burden rate adjusting mechanism arranged in such a way that when it is moved by the common gear of the differential all of the rates of burden distribution will be increased or decreased as may be required, substantially pro rata. Upon that side of the differential gear which is controlled to correspond with the accruing burden is connected, among other things, a driving mechanism automatically operated at a rate corresponding with the total of the waste wages of idle workmen.

In order that the distribution of burden may be properly effected, each workman, as previously stated, is assigned not only a rate of wages but also a normal burden rate. The total of the normal burden rates will ordinarily equal the total of the accruing burden as estimated in advance. The normal burden rate assigned to each workman is dependent upon various items and conditions, such, for example, as his rate of wages, the amount of superintendence he requires, the amount of space he occupies, etc. Whatever the normal burden rate of the various workmen may be, these rates must be varied slightly to correspond with the total of the actual accruing burden if the distributed job costs are to square in with the actual cost of production as determined by the total of the bills paid in the office. My invention provides for the automatic adjustment pro rata of the burden rates assigned to all of the workmen in order that this squaring in of the accounts may be not only accurate but substantially concurrent with production and concurrent with the various charges as they are incurred.

One of the most scientific methods of cost accounting involves the assignment to each machine in the factory of a machine wage rate, that is to say, each machine is regarded as much in the nature of a workman to whom wages are paid. The wages in case of machines would involve those items of expense which are directly associated with the use of the machine. By machine wages then is meant an hourly rate distribution based on the normal running time of the machine and covering all expenses which can best be associated with that machine, as its cost, depreciation, floor space, repairs, power, supplies, etc. It is proper also to assign to each machine a machine burden rate, this being a distribution based on the running time, and covering all other indirect production expense which cannot better be apportioned on the basis of workmen. In case the burden is distributed partly as machine burden rates, it might be well to include general plant cost, depreciation, taxes, etc., whereas the cost of superintendence, general helpers, etc., would clearly be more properly assigned as workmen's burden rates. The proper ratio of machine burden to workmen's burden will vary in different factories and according to different accountants. In like manner, the distribution of both workmen's burden and machine burden may vary in any desired way. No matter how these apportionments may be based or determined, my present invention provides a means for the actual distribution of these burdens automatically, concurrently, and with mechanical accuracy. It provides also a means for analyzing and indicating the analysis of the burden distribution upon whatever plan it may be made. Furthermore, the actual distribution of burden is mechanically squared with the actual accrual or increment of the burden and is easily checked month by month and day by day. Any variation in the accrual due to special expenses or any variations in the distribution due to idle time of men or machines is instantly and mechanically indicated and is promptly adjusted by an automatic pro rata increase or decrease of the normal rates. These results are secured by providing each machine with mechanism similar to that assigned to each workman, such mechanism being adapted for connection by the foreman or superintendent with any job upon which the machine may be engaged. The machine is equipped, furthermore, with an automatic means, such, for example, as an electric switch for increasing the charge made by the machine against the job when the machine is in operation. That is to say, a machine may be assigned to a particular piece of work. It is usually necessary for the workman to set up the machine. While the machine is thus occupied there is no use of power, no wear and tear. When the machine is thus engaged, therefore, the job should be charged at a lower rate than when the machine is running with a consumption of power and lubricating oil, and with more or less wear and tear in excess of the normal depreciation.

Most authorities on factory cost accounting realize and emphasize the importance of accounting on the basis of the time consumed in production. Without analyzing in detail the reasons, it is a fact that quick production is in and of itself an important part of cheap production. Since all of the results secured automatically in the use of my invention are on the basis of time consumed, the analysis of the burden distribution and of the direct production costs as automatically indicated provides a very important aid to the manager in securing efficiency, discipline, and in the detection and location of leaks and excesses, all of which are essential to cheap production.

Certain of the arrangements and devices of my invention which contribute to the general ends as above enumerated may be mentioned. There is provided, for example, an indicating means to show the ratio between accruing and distributed burden. The rate controlling switch requires and is provided with double contacts in place of single contacts in order that the throwing of the switch may control both the burden circuit and the wage circuit. In order that a single connection of a single job plug may control the distribution of two sets of impulses coming from two or more sources or flowing at two or more different rates, I provide in association with the job plug a means for electrically connecting with it and thus through it, a number of other plugs. In connection with each machine there may be provided, in accordance with my invention, two switches, one manually controlled, to be used, for example, when the machine is assigned to a job, and the other a machine controlled switch which is automatically operated by some vital part of the machine, this latter switch assuming one position when the machine is not running and another position when it is running.

All of these and many other important features of my invention will be more clearly understood by considering the accompanying drawings, in which—

Figure 2:
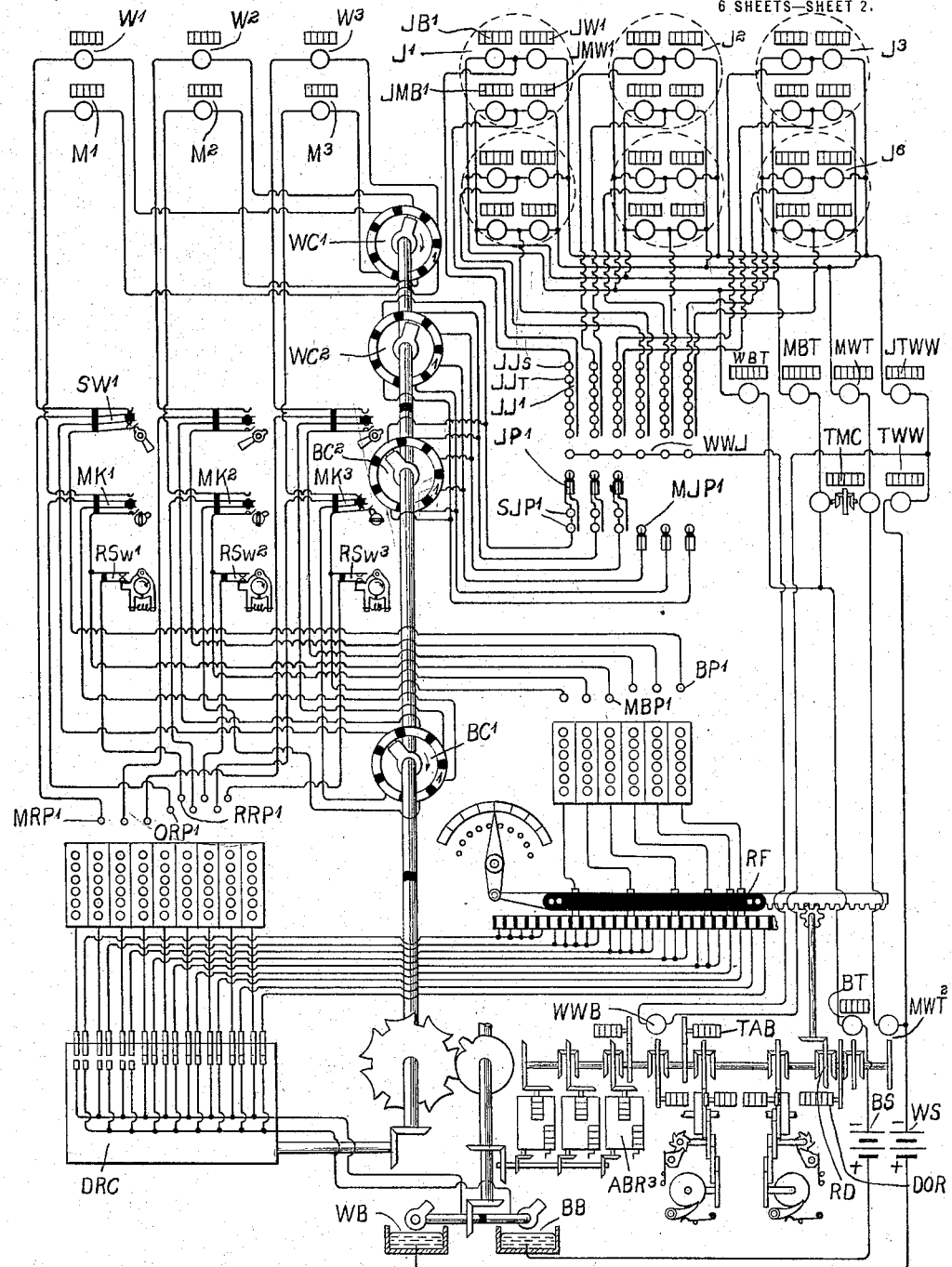
Figure 3:
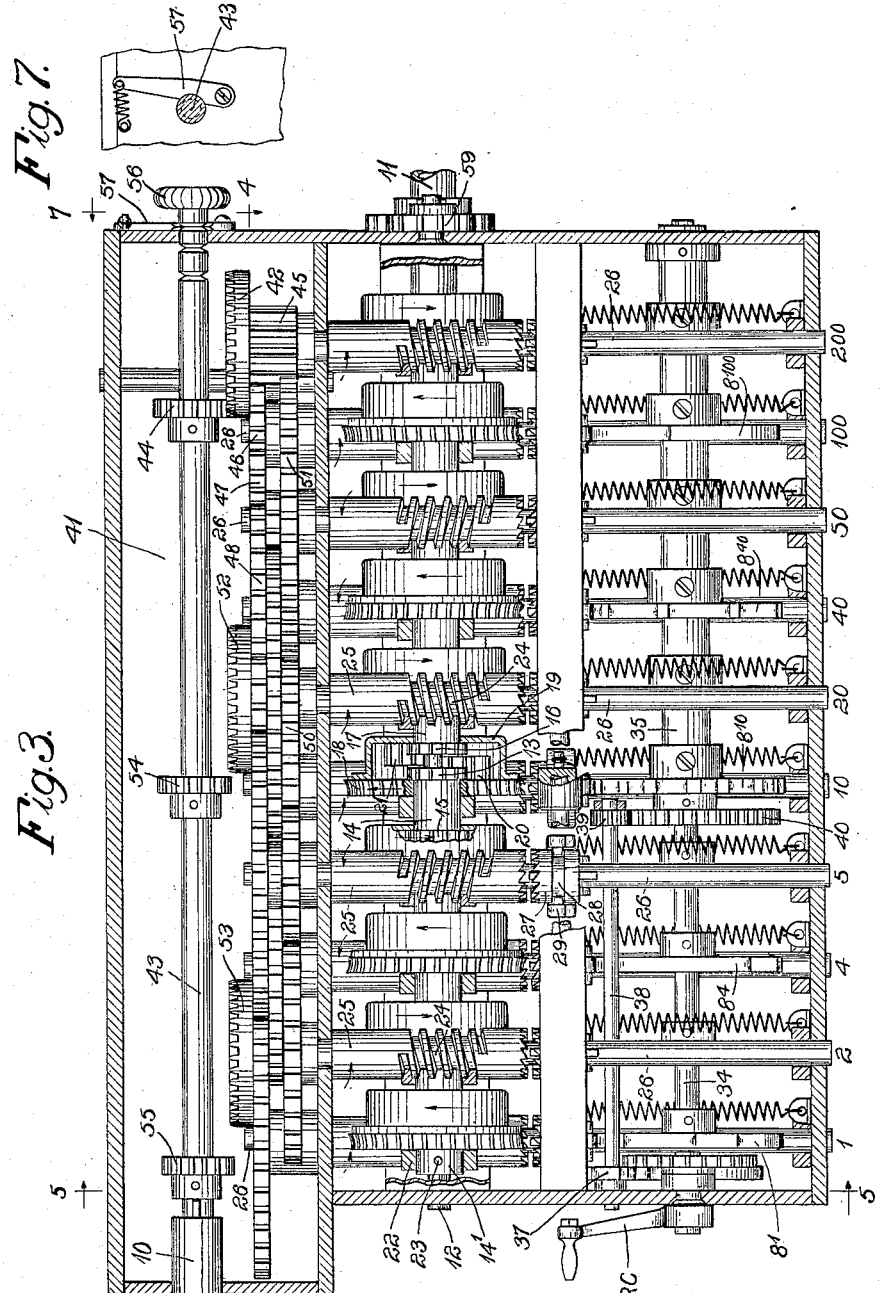
Figure 4:
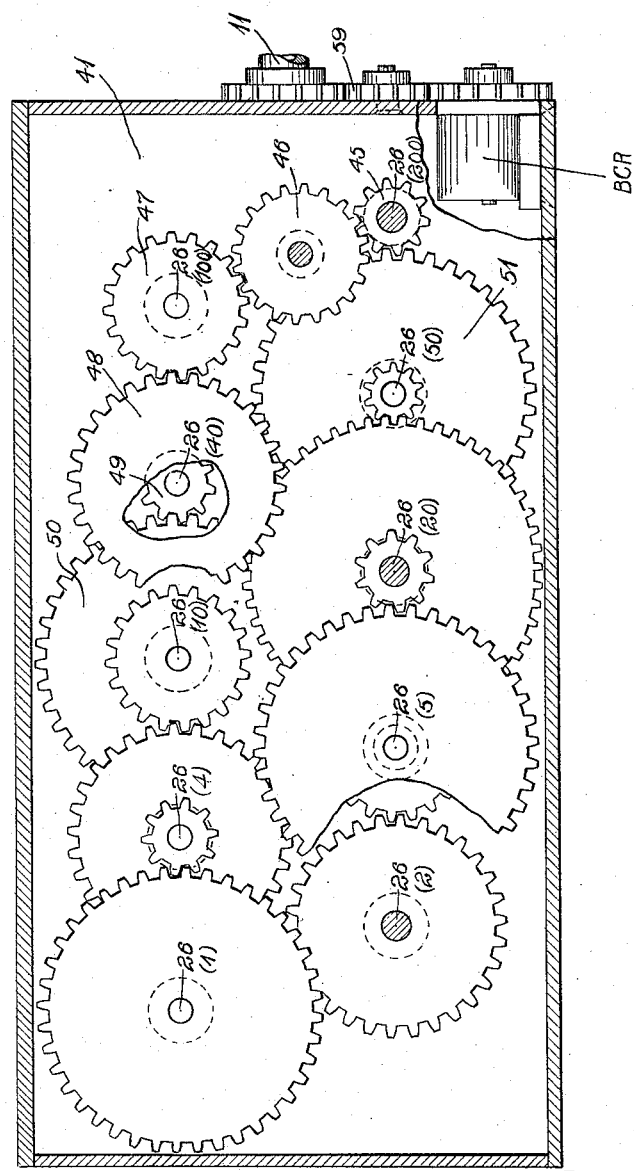
Figure 5:
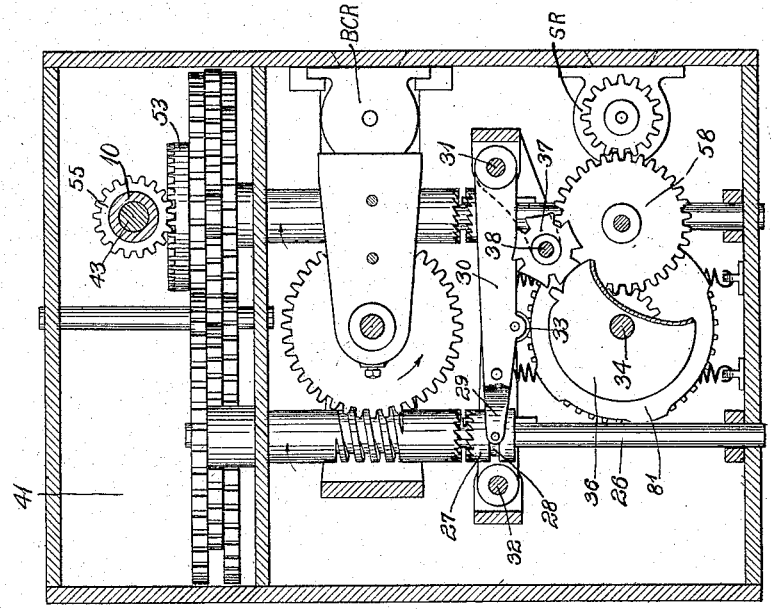
Figure 6:
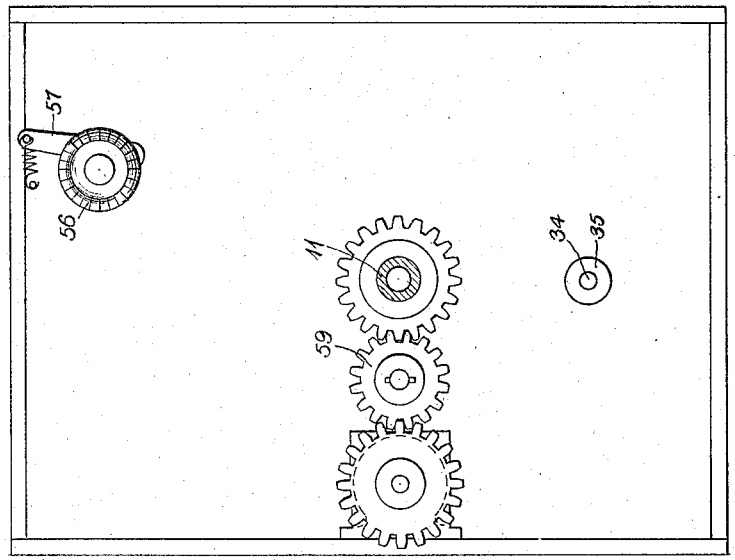

Figure 1 shows diagrammatically the mechanism and circuits forming a simplified embodiment of many features of my invention; Fig. 2 is a diagrammatic representation of the circuits and apparatus when complicated by the addition of the means necessary to take account of the machine costs independently of the direct labor charges; Fig. 3 is a view in front elevation (a part of the cover being removed) of the burden rate controller; Fig. 4 is a cross-sectional view of the burden rate controller taken on line 4—4 of Fig. 3; Fig. 5 is a cross-sectional view of the burden rate controller taken on line 5—5 of Fig. 3; Fig. 6 is an end elevation of the burden rate controller, this view showing the right hand end of the mechanism as indicated in Fig. 3; Fig. 7 is a detail view of a spring detent taken in the direction of the arrow on line 7 of Fig. 3; Figs. $8^1$ to $8^{200}$ show the series of burden rate controller disks; Fig. 9 is a schematic view of the automatically controlled switch associated with the running gear of a machine; and Fig. 10 is a view showing the arrangement of figures on the numeral wheels of the registers in which the zeros are filled up to appear as solid black ovals.

Perhaps the best idea of my invention can be gained from following at the outset the simpler circuit drawing of Fig. 1. Since my present invention is, in a large measure, an amplification of the invention disclosed in my copending application Serial No. 495,717, I wish to call attention to the parts of Fig. 1 which indicate diagrammatically the mechanism and circuit arrangements which have been adopted in working out my present invention. First, taking into account the workmen's wages and the means for distributing them, there is provided a direct rate controller DRC, substantially like that of the earlier application aforesaid. The function of this rate controller is to supply impulses of electric current at a large number of different rates per hour. The rates may correspond with the rates of wages for the workmen, each current impulse corresponding, say, with one cent of wages. Connected with the contacts of the direct rate controller are strips of spring-jacks $WJ_1$ to $WJ_9$. It will be understood that the jacks of each strip are supplied with impulses at a certain rate per hour, the rate of the impulses being different in the case of the different strips of spring-jacks.

The mechanism of the direct rate controller is like that of the rate controller disclosed in the application Serial No. 495,717, except that two pairs of contacts are in the present case provided for each rate instead of a single pair, as in the earlier case. One set of contacts is connected with the strips of spring-jacks WJ and takes care of the wages. The other set of contacts is assigned to the task of burden accounting which will be considered later. Corresponding with the two sets of contacts in the direct rate controller are two circuit interrupters. These take the form of brushes dipping into mercury baths, that indicated at WB being assigned to the battery or source of current WS and connected with those contacts of the direct rate controller which are connected with the wage spring-jacks WJ. The other mercury interrupter BB is connected with the other source of current BS and supplies impulses to the auxiliary set of contacts $AC_1$, $AC_2$, ... $AC_n$. The brushes of the switches WB and BB are insulated from one another so that the wage circuits may be electrically independent of the burden circuits. These brushes are driven through a bevel gear connection by the main shaft MS, this shaft being driven at a uniform rate by any suitable source of power not shown.

Having thus outlined the mechanism for supplying electrical impulses at various rates per hour, we may consider the circuits and apparatus assigned to the individual workmen. To each workman is assigned a wage register, six such registers are shown in Fig. 1, these being designated respectively $W^1$, $W^2$, $W^3$, ... $W^6$. Each of the registers comprises order numeral wheels adapted to be driven by electromagnetic motor mechanism of ratchet or other suitable type as diagrammatically indicated in the drawing, the electromagnetic windings of each register being adapted for connection through the upper pair of contact springs of a workman's switch to a suitable rate plug. The workmen's switches are designated respectively $Sw^1$, $Sw^2$, $Sw^3$, ... $Sw^6$. Each of these switches includes lever mechanism for opening or closing the contacts in a well known manner, and as indicated in the drawing. The rate plugs are indicated at $MRP^1$, $MRP^2$, ... $MRP^6$. Each workman's rate plug may be inserted in any of the spring-jacks $WJ_1$, $WJ_2$, ... $WJ_9$, whereby the rate of impulses flowing through each man's register may be controlled by a payroll clerk. Each workman has access to his own switch Sw whereby he may close his circuit when he begins work in the morning, open his circuit when he stops at noon, close the circuit again in the afternoon, and open it at night. Thus he controls the length of time during which impulses may flow through his wage register.

The circuit through the workman's wage register includes, in each instance, appropriate contacts of a selector commutator. Thus the wire leading from the workman's wage register $W^1$ leads to a segment of the wage selector commutator $WC^1$. Associated with the commutator $WC^1$ is a rotating brush mounted upon a shaft which has a step by step rotation controlled by a Geneva gear movement, comprising the locking wheel Lw and the one-tooth driving gear Dg which is mounted upon the main shaft MS. It is the function of this Geneva gear movement to step the brush $CB^1$ successively into connection with the seven segments of the commutator $WC^1$. Upon the insulated upper end of the commutator shaft CS is mounted also a second commutator brush $CB^2$, this second brush making connection successively with the segments of a secondary wage commutator $WC^2$. With one exception each of the segments of the commutator $WC^2$ is connected with one of the job plugs $JP^1$, $JP^2$, ... $JP^6$. Without going further for the moment, let us assume, as is the fact, that means is provided for connecting any of the job plugs $JP^1$ with the negative pole of the battery WS. The operation thus far may then be traced as follows: The mercury interrupter WB closes circuit with every revolution of the power shaft MS. Each revolution of this power shaft causes also a one step advancement of the commutator brushes $CB^1$ and $CB^2$. Assuming that the rate plug $MRP^1$ is inserted in the spring-jack of one of the strips WJ and that the direct rate controller DRC maintains the closure of the circuit of that spring-jack while the mercury interrupter closes circuit, and assuming also that the workman's switch $Sw^1$ is closed, a current may be traced, when the brushes $CB^1$ and $CB^2$ are in proper position, as follows: from the positive pole of the battery WS through the mercury switch WB, thence through a pair of main contacts of the direct rate controller to a spring-jack in the strip WJ, thence to the rate plug $MRP^1$, through the upper pair of switch springs of the switch $Sw^1$, thence through the electromagnetic motor mechanism of the workman's wage register $W^1$, thence to the first segment of commutator $WC^1$, thence through the brush $CB^1$, (assumed to be in contact with the first segment) thence through the portion $CS^1$ of the shaft to the brush $CB^2$, thence to the first contact of commutator $WC^2$, thence to the job plug $JP^1$, and to the negative pole of the battery WS.

It will be understood that the direct rate controller DRC serves to open such a circuit as that just traced during certain of the closures of the circuit by the mercury switch WB, when enough impulses will be permitted to flow through the direct rate controller contacts to actuate the workman's wage register an amount corresponding with his wages per hour. The opening and closing of the workman's switch $Sw^1$ controls the completion of the circuit through the wage register corresponding with the hours of work. The commutator brushes $CB^1$ and $CB^2$ close the circuit successively for the various wage registers, whereby an opportunity is offered for the flow of a current impulse once each minute, provided the flow of such an impulse is permitted by the contacts of the direct rate controller. It will be apparent, therefore, that each workman's wage register will show at the end of a pay-roll period the total amount of wages which he has earned during that period. The apparatus provides means also whereby any workman's rate may be changed at will by the pay-roll clerk, it being necessary merely to transfer the man's rate plug MRP from the spring jack in one strip to a jack in some other strip.

We come now to a consideration of the routing of the current impulses beyond the circuits each of which is individual to a particular workman. My invention provides for the distribution of the wages automatically to and through registers assigned to the various jobs. Thus, assuming that there may be in process in the particular factory any number of jobs from 1 to 6, I provide a set of six job registers. Since my present invention deals not only with direct labor cost but also with the distribution of the burden, I provide for each job a pair of registers. These are designated in Fig. 1 as $JW^1, JW^2, \ldots JW^6$ and $JB^1, JB^2, \ldots JB^6$, the former taking account of workmen's wages and the latter of the burden distribution.

Each pair of registers assigned to a particular job, as, for example, $JW^1$ and $JB^1$ is provided with a common wire, leading, as shown, to the strip of job-jacks $JJ^1$. It will be noted that a circuit may be traced through the common wire of each pair of job jacks through the electro-magnetic motor mechanism shown diagrammatically in connection with each job wage register, through a wire leading to the negative pole of the wage battery WS, there being included in the common wire leading to the negative pole of the battery a job wage totaling register JWT and a wage total register WT. It will now be apparent how the wage impulses of current coming from the individual circuits assigned to the various workmen may be routed through the job wage registers in order that each job wage register may show at all times the direct labor cost of the job to which it is assigned. Take, for example, job wage register $JW^2$. It will be noted that the common wire leading from the strip of jacks $JJ^2$ may be brought into connection with one or more of the terminals of the workmen's individual circuits by inserting one or more of the job plugs JP into a jack of the strip $JJ^2$. Assuming the connections thus to be made, the current impulses which pass the various switches on reaching the job plugs will pass on through the job jacks to the common wire of the pair of registers assigned to job 2, where they may be traced through the electromagnetic mechanism of the register $JW^2$, and thence to the wire leading to the job wage total register JWT, thence on through the wage total register WT, and to the negative pole of the battery WS. Since the workmen's individual circuits are closed in succession by the brushes and commutators $WC^1$ and $WC^2$, it will be apparent that there will be no conflict of current impulses, wherefore the job wage register $JW^2$ will be actuated by a number of impulses corresponding with the total of the wages of the workmen assigned to job No. 2. In like manner, the job plugs of all of the workmen may be inserted into a spring jack of the strip assigned to the job upon which the various workmen are employed whereby each job wage register will show the total of the direct labor cost of that job and the job wage total register JWT will show the total of all of the wages earned upon productive jobs.

Since it will not always be possible to employ every workman in the factory upon a productive job, it is desirable to provide means for taking account of the waste wages. Thus, for example, if workman No. 2 finishes his work upon job No. 5 and the foreman does not have immediately at hand some other job to which that workman can be assigned, the foreman will insert the job plug $JP^2$ into a waste wage jack of the strip WWJ. The wire leading from this strip of waste wage jacks leads first through the electromagnetic ratchet mechanism operating upon a common gear of the differential gear, (this combination being designated by the reference letters WWB) and thence to the wire leading to the wage total register WT. Disregarding for the moment the function of the waste wage burden mechanism WWB, it will be seen that any current impulses coming from the workman's individual circuits and flowing to the waste wage jacks will pass through the wage total register WT on their way to the negative pole of the battery WS. Thus, while the job wage total register JWT takes account only to the impulses which pass through the individual job wage registers, the wage total register WT takes account of all of the wage impulses. The job wage total register will therefore show the total labor cost which can be assigned to particular jobs, whereas the wage total register WT will show the total of the wages earned whether assigned to productive jobs or not.

We come now to a more detailed consideration of the means for distributing the appropriate burden charges to the various jobs. With the system shown in Fig. 1 the total burden is determined from the fiscal accounts. Thus, for example, it will be found that the interest on investment, insurance, depreciation, heat, light, power, superintendence and any number of other items cost a certain amount per month. The normal working hours per month are known in advance and from these figures is determined the amount of burden charge which must be distributed each hour in order that the distributed burden will equal at the end of the month the real burden as determined from the fiscal accounts. The apparatus shown in Fig. 1 assumes that the burden distribution will be made as a supplemental rate with which each workman is burdened. Thus, for example workman No. 1 may be paid wages at the rate of 22 cents per hour. The number of workmen in the factory being known, and account being taken also of the fact that the burden rate for all of the workmen need not be the same, some, for example, requiring more space and superintendence than others, each workman is assigned a normal burden rate, say in the case of workman No. 1 for example 27 cents per hour. Workman No. 2 may be earning wages at the rate of 35 cents per hour, and since he requires but little superintendence and uses no power, he may be assigned a normal burden rate of 17 cents per hour. So on with respect to all of the workmen, each is assigned a normal burden rate supplemental to his rate of wages.

To each workman is assigned not only a wage circuit, but also a burden circuit, the burden circuits being very much like the wage circuits and controlled in much the same manner. Thus, for example, workmen's switches $Sw$ comprise not only the upper pair of contact springs for controlling the continuity of the circuit of a wage wire, but include also, in each instance, a lower pair of contacts included in the circuit of a burden wire. The individual burden circuits each begin in a burden plug ($BP^1$, $BP^2$, . . . $BP^6$) and may be traced through a pair of normally open contacts in the corresponding workman's controlling switch SW to a segment of a burden commutator $BC^1$, thence at appropriate intervals through the brush of this commutator, the portion $CS^2$ of the commutator shaft to the brush of the secondary burden commutator $BC^2$, and thence to the terminals of the individual burden wires or circuits which are identical with the terminals of the individual wage wires or circuits, namely the job plugs $JP^1$, $JP^2$, . . . $JP^6$. The burden plugs BP are adapted for insertion in any jack of the strips of jacks $BJ^1$, $BJ^2$, . . . $BJ^6$. Without stopping for the moment to consider the mechanism which supplies current impulses to the burden spring jacks, it may be assumed that as in the case of the wage spring jacks WJ, these strips of burden jacks are supplied with current impulses at different rates, wherefore, the burden rate plug BP assigned to each workman may be plugged into an appropriate burden jack to saddle upon the workman the burden rate appropriate to the peculiar conditions of his labor. The burden impulses of current flowing from the burden jacks through the burden wires or circuits in succession as controlled by the burden commutators $BC^1$, $BC^2$, and during the hours of labor as controlled by the workmen's switches, flow through the job plugs and the job spring jacks into which the job plugs are inserted, thence through the common wires leading to the pairs of job registers, and thence through paths distinct from those previously traced for the wage impulses. Since the burden impulses are delivered by a separate source of current, namely the battery BS, it will be apparent that when the burden impulses reach the common wire leading to a pair of job registers the burden impulses will be diverted through the job burden register JB and thence to the wire which leads through the total burden register TBR to the negative pole of the battery BS. The result of this arrangement is that the job burden register of each pair of job registers will indicate in a manner corresponding with that in which the job wage registers operate, the total of the burden charges saddled upon the workmen who work upon the job to which the particular job burden register is assigned. So, also, since all of the burden impulses flow through the total burden register TBR, this register will indicate at all times the total of the burden actually distributed to the various jobs in process. This much understood, we may consider the means for supplying the burden impulses and for varying the various burden rates. It has been explained that the direct rate controller is equipped with an auxiliary set of contacts $AC_1$, $AC_2$, . . . $AC_n$. Each set of auxiliary contacts AC is closed during certain minutes of the hour and open during the remainder of the time. The set of contacts which controls a twenty cent burden rate may, for example, be closed during every third minute and open during the two minutes which intervene. Each strip of burden spring jacks BJ is connected with one of the auxiliary contacts of the direct rate controller. The apparatus shown in Fig. 1 may be assumed to be in its normal position wherein it will be seen that the strip of jacks $BJ^1$ is connected through a regulating brush $RB^1$ to a segment of the regulating commutator RC, which, in turn, is connected with one of the pair of auxiliary contacts $AC_8$ of the direct rate controller. Each of the other strips of burden spring jacks is in like manner connected through a regulating brush and a segment of the regulating commutator with a set of auxiliary contacts in the direct rate controller. Normally, therefore, the strip of burden jacks $BJ^1$ is supplied with current impulses at a rate determined by the auxiliary contacts $AC_8$ of the direct rate controller. The strip of burden spring jacks $BJ^2$ is supplied with current impulses at some other rate as determined by another set of auxiliary contacts in the direct rate controller. In like manner every other strip of burden spring jacks is supplied with a normal number of current impulses per hour.

The assignment of burden rates to the various workmen is more a matter or ratio or proportion than it is of absolute values or amounts. In order to establish the proper ratio or proportion, however, it is convenient to divide the estimated normal burden between all of the workmen to whom a burden rate is to be assigned; thus, one man's burden rate will be so many cents per hour and another man's normal burden rate will be some other number of cents per hour. Each workman's burden plug BP is inserted in a jack of the strip of burden jacks corresponding with his normal burden rate. If the actual accruing burden could be known with certainty in advance, or if never changed, and if the number of workmen and every other condition was constant, there would be no occasion ever to change the burden rates of the various workmen; but, as a matter of fact, all of the conditions do change, and the estimates of expenses which must be charged as burden cannot in the very nature of things correspond exactly with the facts as in the future they develop.

It is for the purpose of adjusting the burden rates with which the various workmen are saddled to correspond with variations in the accruing burden that the regulating commutator RC and the regulating brushes $RB^1$ are provided. It will be seen from the diagrammatic showing of the drawing that the several regulating brushes insulated from each other are carried in a shiftable regulator frame RF. It will be apparent, also, that if the regulator frame is shifted one space to the right the brush connected with the strip of spring jacks $BJ^6$ will be transferred from the position in which it connects with the third set of auxiliary contacts $AC_3$ to a position in which it connects with the second set of auxiliary contacts $AC_2$, there being, of course, a corresponding change in the rate of impulses. In like manner the connection of the regulator brush associated with the strip of burden spring jacks $BJ^5$ will be transferred from the fourth to the third segment of the regulator commutator with a corresponding change in the rate of impulses. The set of auxiliary contacts $AC_5$ is connected with three segments of the regulator commutator, as shown. The auxiliary contacts $AC_7$, $AC_8$ and $AC_9$ are each connected with five segments of the commutator. The result of this multiple connection of the lower segments of the rate commutator is that a one-space shift of the regulator frame RF will effect a change in the higher burden rates only. The reason for this arrangement is as follows: The burden rates may vary between wide limits. The lowest burden rate may, for example be eight cents per hour and the highest burden rate fifty cents per hour. If, now, we wish to effect a 2% change in all of the burden rates, we should have to raise the fifty cent rate to a rate of fifty-one cents. The eight cent rate would, however, be increased merely to 8.16 cents. Since it is not convenient to make small fractional changes in the burden rates, the means disclosed in the drawing is provided whereby a desired 2% change would effect only the higher burden rates but not the lower burden rates. If the desired change is of a considerable percentage, a rate of ten cents per hour may be raised to eleven cents per hour, while the fifty cent rate would be increased to fifty-five cents per hour. The multiple connection of the segments of the regulating commutator provides for this sort of an adjustment of the burden rates, both when increased above the normal or when decreased below the normal.

We have now to consider the automatic means for shifting the regulator frame and brushes. The frame is provided with a regulating rack RR, which is in mesh with the regulating pinion RP. The pinion is mounted upon a shaft upon which is carried also a bevel gear meshing, as shown, with the common gear of the regulating differential gear RD. The left-hand primary gear $RD^1$ of this regulating differential is adapted to be driven at a rate corresponding with the rate of the accruing burden. The right-hand primary gear $RD^2$ of the differential RD is driven by the electromagnetic motor mechanism of the total burden register TBR. The primary gears of the differential RD rotate in opposite directions, wherefore, if they both operate at the same rate, the common gear, which is in mesh with the regulating pinion RP, will stand in a fixed position. If, however, there is a difference in the rates of rotation of the two primary gears of the differential, the common gear will be turned in one direction or the other, depending upon which primary is running more rapidly, and the result of such turning of the common gear will be to shift the regulating frame RF in one direction or the other, as the case may be. If, therefore, the total distributed burden corresponds exactly with the accruing burden, as measured by the rotation of the primary gear $RD^1$, there will be no shifting of the regulator brushes. We have now, however, to consider those conditions which would cause the primary gears of the differential RD to rotate at different rates, and thus to shift the regulator brushes into higher or lower positions, as may be required.

There are a number of factors which must be taken into consideration in determining the rate at which the primary gear $RD^1$ is to rotate. First, there are absolutely fixed charges which can be known to a certainty in advance,—for example, interest on investment, insurance, rent, etc. Second, there are certain items of the overhead expense which will, with certainty, be incurred, such as the coal bill for heat and power, the light, water supply, and, probably, in most cases superintendence and clerical help, but just the amount of such expense cannot be positively known in advance. Third, there will be, also, certain overhead expenses which are wholly irregular; for example, cost of repairing break-downs, periodic cost of house or factory cleaning, and other things of like nature. Then there is another item distinct from the ordinary overhead charges *per se* which should be taken into account in adjusting the burden rates, namely, the waste or idle time for which wages are paid, but which cannot be charged directly to any particular specific job. In accordance with my invention means is provided whereby each of these factors may have its effect in determining the rate of rotation of the primary gear $RD^1$.

To take account of the burden charges of the first three classes I provide one or more accruing burden registers. A burden accruing register for this purpose is fundamentally a device for causing the rotation of a gear at a predetermined rate. The accruing burden register of my invention is illustrated in detail in Figs. 3 to 7 and $8^1$ to $8^{200}$, inclusive. I shall not stop now, however, to describe these mechanisms in detail. Suffice it to say that in Fig. 1 I have illustrated three such accruing burden registers, designated respectively $ABR^1$, $ABR^2$ and $ABR^3$. It will be noted that each of these accruing burden registers, as diagrammatically illustrated, contains in one corner a setting register SR and a setting crank SRC; also, that each register is supplied with power from the main shaft MS through a series of bevel gears. It is to be noted also that each of the accruing burden registers is provided at the opposite end from that at which the power is received with a bevel driving gear, these being designated respectively as $DG^1$, $DG^2$ and $DG^3$. Each accruing burden register is, in a sense, a set or nest of change gears whereby the power received at a uniform rate at one end may be made to rotate the driving gear at the other end at any desired rate. The rate of driving—in other words, the ratio of transformation—is determined by the setting of the setting register SR and the mechanism associated therewith. Each accruing burden register is provided with a burden charge counter or register BCR, by means of which the amount of rotation of the associated driving gear is counted.

The use of the accruing burden registers is as follows: The known fixed charges which will accrue during the fiscal month are totaled, whereby one may calculate the hourly overhead charge which must be made to correspond with these fixed charges; thus, if the fixed charges are known to be $2400.00 per month, and if there are two hundred working hours in the month, it will be necessary to charge $12.00 per working hour in order that the distributed charges may square in with the fiscal expenses. The first of the accruing burden registers may be assigned to take account of the expenses of the first class. It will be necessary for the accountant, therefore, to set the register $SR^1$ at $12.00. This adjustment of the setting register of the accruing burden register will adjust the change gear mechanism in such a way that the motion received in the first accruing burden register from the main shaft will result in the rotation of the driving gear $DG^1$ at a rate corresponding with $12.00 per hour. At the end of the two hundred hours the driving gear $DG^1$ will have rotated an amount corresponding with $2400.00, which will appear upon the numeral wheels of the register $BCR^1$.

The estimated amount of the coal, light, heat, power, water and other like bills for the month is footed and divided between two hundred working hours. This figure may be used to determine the setting of the second accruing burden register, with the result that this second register will deliver to and through its driving gear $DG^2$ an amount of motion corresponding with the estimated total for the month of the second class of charges. If, now, on the tenth working day of the month, for example, it is found that the cost of fuel for the month is going to be higher than was originally estimated, it is only necessary to figure the amount by which the setting of the accruing burden register must be raised in order that the total amount of the associated driving gear may at the end of the month correspond with the actual expense. The setting of this second accruing burden register may be changed from time to time as the end of the month approaches so that the total of the actual overhead expenses, whatever they may prove to be, will be distributed as burden to the various jobs in process.

The third class of overhead expenses, namely, those which are wholly irregular and which cannot well be figured in advance, may be used to determine from time to time the setting of the third accruing burden register. These irregular expenses may be distributed within the month in which they are incurred, or they may be distributed over a number of months, just as may be best warranted by the facts and as determined by the judgment of the accountant. At whatever hourly rate it is determined to distribute any such extraordinary expenses it is but necessary to set the third accruing burden register at that hourly rate, whereupon the driving gear BG³ will be driven at the predetermined rate necessary to distribute the expense within the time decided upon.

In explaining the setting and running of the accruing burden registers I have assumed but three such registers, and have illustrated their function by citing certain assumed items of expense. It will be apparent that it is for the accountant in each factory or business in which my invention is installed to determine how the various items shall be charged and classified. The point is, however, that no matter how it is decided to classify the overhead expenses my invention provides a means for automatically distributing them in a predetermined ratio through the burden rates saddled upon the direct labor costs to the various jobs in process.

The motion derived from the driving gears of the accruing burden registers, no matter how many there may be, is all totaled and transmitted to the primary gear RD¹ of the differential RD. The total amount of this rotation is recorded in the total overhead register TOR, this register being provided with a gear which is in mesh with a gear upon the overhead shaft OS to which the motion of all of the accruing burden registers is transmitted. The way in which this totalization of the motion derived from the three accruing burden registers is accomplished will be understood by reference to the arrows showing the direction of rotation of the various parts. The driving gear DG¹ turns the bevel gear with which it is in mesh in one direction, and, assuming the other two accruing burden registers to be stationary, it will be seen that motion will be transmitted through the differential gears to the overhead shaft OS in such a way as to cause its rotation in the direction of the arrow there shown. If now the driving gear DG² of the second accruing burden register be considered to be in rotation in the direction of the arrow associated with that driving gear, the common gear of the differential with which that driving gear is in mesh will be rotated in the direction of the arrowhead indicated in the periphery of the wheel, and this motion will also result in a rotation of the overhead shaft in the direction of its associated arrow. So also the rotation of the driving gear DG³ in the direction of the associated arrow will result in rotation of the overhead shaft in the direction of its arrow; in other words, the driving gear of each of the accruing burden registers will have its corresponding result in the rotation of the overhead shaft regardless of any motion which may be transmitted to the overhead shaft by other accruing burden registers.

One other factor, namely the wages paid for waste or idle time, is to be considered; but before following this factor it may be desirable to assume that the common gears of the differential gears WD associated with the waste wage mechanism and EAD of the excess burden accrual storing mechanism and EDD of the excess distributed burden storage mechanism are stationary. With this assumption the motion of the overhead shaft OS may be traced through the primary gears and idler pinions of the differential gears to the primary gear RD¹, the direction of rotation of the intervening shafts being as indicated by the arrows.

It will be remembered that when any workman is idle his circuit is connected with a waste wage jack of the strip WWJ, whereupon current impulses corresponding with the amount of the waste wages will be caused to flow through the circuit of the electromagnetic motor mechanism operatively associated to drive the common gear of the differential WD. Any waste wages will, therefore, result in a rotation of the common gear of the differential WD in the direction of the arrowhead shown upon the periphery of the common wheel of this differential. The result will be that an amount of motion corresponding with the waste wages will be transmitted to the shaft upon which the righthand primary gear of the differential WD is mounted, and this motion will be transmitted through the differentials EAD and EDD to the primary RD¹ of the regulator differential RD. Geared to the common wheel of the differential WD is the waste wage total register WWT. A register TAB is connected by gears to the shaft upon which the right-hand primary of the differential WD is mounted, this register TAB indicating the total of the accrued burden, whether from fixed or variable overhead charges or due to waste wages paid to workmen.

It will, I think, now be apparent how all of the factors of the accruing burden are made to contribute to the rotation of the primary RD¹ of the regulating differential RD. There may at times be no irregular overhead charges to be distributed when, of course, the accruing burden register ABR³ will be set at zero, and no motion will be transmitted to the primary gear RD¹ from the driving gear DG³. At such times the driving gear DG³ is locked by a worm and worm wheel against backward rotation which might permit the escape of some motion which should be transmitted to the primary gear RD$^1$. So, also, at times there may be no waste wages which should be added to the accruing burden. In this case the common gear of the differential WD and the waste wage total register WWT will stand at rest, the motion of the accruing burden registers being transmitted through the differential WD, as will be understood. Whenever a workman completes a job and is not assigned to a new job, his job plug will be inserted in the strip of waste wage jacks, whereupon the rotation of the common gear of the wage differential WD will ensue, with the result of an increased rate of rotation in the primary gear RD$^1$ of the regulating differential RD. It is just such variations in the accruing burden which give rise to the necessity for an automatic adjustment of the regulating frame RF and brushes RB. Suppose, for example, that the normal number of workmen is saddled with normal burden rates whose total would correspond with the normal accruing burden as set up in the accruing burden registers ABR$^1$ and ABR$^2$. It will be apparent that the rate at which the burden is distributed will correspond exactly with the rate at which the burden accrues. Since the primary gear RD$^1$ is rotated at a rate corrsponding with the accruing burden, and since the primary gear RD$^2$ is rotated at a rate corresponding with the distributed burden, and since both rates are the same, there will be no rotation on the common gear of the regulating differential RD. If, now, one or more men become idle and are connected with the waste wage jacks the common gear of the waste wage differential WD will begin to rotate and thus to transmit an element of rotation to the primary gear RD$^1$. The moment this primary gear RD$^1$ begins to rotate at a speed higher than that of the primary gear RD$^2$ the common gear of the regulating differential will be rotated in the direction indicated by the small arrow-head. This, in turn, will cause a rotation of the regulating pinion RP in the direction of the arrow associated therewith, and this will shift the regulating frame and brushes to the right. This shifting of the regulating brushes will increase the burden rates at which current impulses are supplied to one or more strips of spring jacks. As soon as the burden rates are increased in the spring jacks an increased number of impulses will flow through the burden circuits, thereby causing an increased rate of operation in the electromagnetic motor mechanism of the total distributed burden register TBR. (No numeral wheels are shown in connection with TBR and none are necessary unless the reading be specially desired, it being merely necessary that the electromagnetic motor mechanism should drive the primary gear RD$^2$ of the regulating differential RD.) Not only may the rate of operation of the common gear of the wage differential WD vary from time to time in accordance with the number of idle workmen, but the rate of operation of the driving gear DG$^2$ and of the driving gear DG$^3$ may be varied from time to time,—always with the result that the common gear of the regulating differential RD will be turned forward or back, as may be required, automatically to shift the regulating frame RF and brushes RB, this, in turn, to adjust the burden rates with which the workmen are saddled, thereby to distribute the whole of the accruing burden and thus to bring the rate of rotation of the primary gear RD$^2$ into conformity with that of the primary gear RD$^1$, whereupon the changing of the burden rates is stopped and made substantially constant at values which will effect the distribution of an amount corresponding with the total accruing burden.

There still remains to be explained in connection with this drawing the mechanism for limiting the adjustment of the burden rates and for storing any excess of accruing burden which is not distributed, or, on the other hand, any excess of distribution. It will be noted that the regulator frame RF is connected by a link with an indicator hand IH, this hand working over a suitable dial which shows how far the burden rates may have been shifted from the normal and in which direction. A series of holes at either side of the hand IH is adapted for the reception of stop pins. A stop pin may be inserted in a hole to one side of the indicating hand and another stop pin may be inserted in a hole at any desired distance on the other side of the indicating hand. These stop pins limit the degree of rotation of the indicator hand IH, and thus of the regulating brushes RB and their frame RF. The result of this construction may be explained by an example: If a very large number of workmen is idle, although receiving wages, the burden will accrue at an excessively high rate. This will cause a rotation of the common wheel of the regulating differential, tending to shift the regulating frame and brushes to the right. The tendency would be to shift the regulating brushes far enough to increase the burden rates of the workmen to a point which would counterbalance the increased burden accrual. It might be considered preferable not to attempt to increase the rates of burden distribution to such an extent as to counterbalance completely this excessive burden accrual, and to this end the stop pin comes into play to limit the distance to which the regulating brushes can be shifted to the right. The regulating differential carries the brushes to the right just as far as they will go and until the stop pin is encountered. Since the stop pin limits therefore the degree to which the burden rates may be automatically raised above their normal the burden rates of the workmen will not be raised sufficiently to effect the complete distribution of the accruing burden. While I have illustrated this point by reference to an excess of waste wages, it will be apparent that the stop pins will come into play in the same way in connection with an unusually high rate of burden accrual,—no matter from what source the extraordinary expense may come. Furthermore, while I have referred to automatic adjustments to take care of the extremely large accrual of burden, it will be apparent that the mechanism operates automatically to decrease the rates at which the burden is distributed when the rate of the burden accrual is low. A stop pin in like manner limits the percentage by which the normal burden rates may be decreased.

The question will arise as to what becomes of that part of the accruing burden which fails of distribution when the stop pin comes into play to limit the extent to which the normal burden rates may be raised; also, what, if any, compensation is made for a distribution of burden in excess of the accruing burden when the stop pin at the lower end of the scale limits the extent to which the burden rates are decreased below the normal. The answer is in the storage mechanisms controlled by the excess burden accrual differential EAD and the excess distributed burden differential EDD. Considering first the excess burden accrual differential EAD and the associated mechanism, it will be seen that the common gear of the differential EAD is in mesh with a gear train which leads finally to a stop cam SC with which the stop pawl SP is adapted to coöperate. This stop cam and pawl prevent rotation in a direction contrary to that indicated by the arrow on the cam SC. The cam and pawl do not, however, prevent rotation of the cam in the direction of the arrow. When, therefore, the accruing burden becomes very high and the stop pin has prevented the burden rates from being increased correspondingly, there will be a greater degree of rotation of the primary differential at the left-hand side of the differential EAD than can be absorbed through the primary gear $RD^1$ of the regulating differential. When the upper stop pin has been encountered, no further rotation of the common gear of the differential RD can ensue, and when this limit is reached the amount of rotation of the primary gear $RD^1$ is limited by the amount of contrary rotation of the primary gear $RD^2$. The latter is, of course, controlled by the amount of the distributed burden. The result is that the excess of motion corresponding with the excess of accruing burden escapes into the gear train which is in mesh with the common wheel of the differential EAD. This escape for the excess motion is, under normal conditions, barred by the tension of the spiral storing spring SS. This spring tends to unwind and thus to bring the notch of the stop cam SC against the pawl SP. The tension of the spring must furthermore be overcome before any motion can be transmitted from the differential EAD into the associated gear train, and the result is that until the stop pin is encountered by the indicator hand IH the easiest path for the motion of the accruing burden is into the regulating mechanism. It is only when the motion of the regulating mechanism is barred by the stop pin at the upper limit that the tension of the storage spring SS is overcome to permit the absorption of the excess motion, with a consequent rotation of the gear train. The ratio of gearing is made such that the stop cam SC will never receive as much as a full rotation, the result being that as soon as the accruing burden rate drops below that of the distributed burden rate, or, to put the matter reversely, as soon as the rate of burden distribution begins to exceed the rate of burden accrual, there will be a tendency for the speed of rotation of the primary gear $RD^1$ of the regulating differential to drop below that of the associated primary gear $RD^2$. This would result in shifting the regulating frame to the left. But here the storage mechanism comes in to keep up the burden rate until the stored excess of accrued burden has been discharged. It will be remembered that the spring SS is a stiff one, whereupon the common gear of the differential EAD will be driven by this spring to supply power to the primary gear $RD^1$ of the regulating differential as soon as an outlet through this channel is afforded for the power stored in the spring SS. The result is that the power stored in the spring SS will be supplied through the common gear of the differential EAD to keep the speed of rotation of the primary gear $RD^1$ up to that of the primary gear $RD^2$, thus preventing any backward rotation of the common gear of the regulating differential RD until the full amount of power stored in the spring SS has been discharged. This point will be reached when the cam SC has returned to the position shown in the drawing, in which the notch engages the pawl SP to stop the further unwinding of the spring SS.

Associated with one of the gears of the storage train is a holding ratchet HR and an associated holding pawl HP. If after there has been a greater or less storage of excess accrued burden in the storage register EAR, which is geared to the gear train of the spring SS, the accountant wishes to hold the amount stored for future distribution he has but to throw the holding pawl HP into the position in which it will engage the teeth of the ratchet wheel HR, thus preventing the unwinding of the spring SS with consequent discharge of accrued burden into the system. The stored excess may be held for distribution later at any appropriate time, if such course seems to the accountant warranted and desirable under the circumstances of the storage of the excess. The differential gear EDD is associated in like manner with storage mechanism for storing the excess of distributed burden when the stop pin at the lower end of the scale limits the extent to which the normal burden rates would be decreased by the operation of the automatic mechanism unchecked. It will not, I think, be necessary to describe in further detail the operation of this mechanism for storing such excess of distributed burden.

To recapitulate with respect to the storage mechanisms, it may be said that they operate to store any departure on either side from the full and complete distribution of burden precisely in accordance with the accrual of burden, and, later, when the conditions have returned more nearly to their normal, the storage mechanisms operate automatically, unless checked by the holding mechanism manually operated, to maintain burden rates differing, if need be, from those which would otherwise be established automatically to clear the system of any excess which may have been accumulated during the abnormal period or periods.

Before proceeding to a description of the more complete embodiment of my invention, as shown in some of the other drawings, it may be well to mention some of the more important features diagrammatically disclosed in this Fig. 1. The system thus far explained in more or less detail provides for the assignment to each workman of a burden rate, which is quite distinct from his wage rate. The normal burden rate for each workman is determined by the accountant upon the basis of any and all information and data at his command. The accruing burden, as determined from the commercial or fiscal accounts, may be determined with a fair degree of approximation in advance, and this preliminary estimate is made the basis upon which the normal burden rates are assigned. As time progresses, however, it will be found that the actual accruing burden does not correspond exactly with the accruing burden as estimated in advance. The accountant may, in accordance with my invention, adjust the setting of the accruing burden registers or controllers to correspond with any such deviations from the estimated accruing burden. The apparatus operates automatically to readjust some or all of the burden rates assigned to the workmen to insure the prorata distribution of the whole of the accruing burden, as determined by experience and as set by the accountant in the accruing burden registers. The mechanism accomplishes the distribution of the burden quite automatically, and it is necessary for the accountant merely to check and follow the fiscal accounts and to set the accruing burden registers in conformity therewith.

My invention, as thus far described, provides also a means for checking, in so far as may be desired, the automatic adjustment of burden rates to conform with the fiscal accounts, as determined by experience, so that any unusual excess at one period is automatically held to be distributed over a longer period if desired. If, on the other hand, it is desired to hold the excess for a time before beginning or completing its automatic distribution, the accountant has it in his control to lock either or both of the storage mechanisms so that they will not discharge their accumulations until he decides to unlock them, thus releasing the excess to be distributed.

I have prepared the drawing of Fig. 1 to explain the features of my invention thus far described for the sake of simplifying the exposition. In Fig. 2 I have illustrated the essentials of what is shown in Fig. 1, but have added considerably thereto. Fig. 2 discloses in diagrammatic form the mechanism necessary for cost accounting upon a plan which involves the consideration of the various machines in a factory as wage earning devices. The plan of accounting for which this mechanism of Fig. 2 is adapted involves the assignment to each machine of a rate of wages; in fact, two rates of wages. The machine is assigned a low rate of wages corresponding with occupied time but time in which the machine is not running and using power, lubricants, etc. Take, for example, the case of a turning lathe in a machine shop. The machinist is given a cylinder to bore upon this lathe. It may require an hour's time for the machinist to fit the necessary chucks, lay out the tools and clamp the cylinder in place. The machine is during this period occupied but not running. The lathe is assigned a rate of so-called machine wages for such unoccupied time, and the job of boring the cylinder or making the engine of which the cylinder is to be a part is charged with the lathe or machine wages for one hour of occupied time. When the lathe is running, as in boring the cylinder, it consumes power, requires lubricant, and is subject to a much higher rate of depreciation than when occupied merely in "setting up" operations. Obviously there should be a higher rate of machine wages for such running time, and my invention provides for cost accounting upon the basis of an increased rate of wages for running time of machines.

In a manner corresponding with that in which each workman is saddled with a burden rate so also it may be desirable to saddle each machine with a burden rate which is independent of the machine wages. In a factory fully equipped with my invention then we have automatic means for charging the workmen's wages to the jobs upon which they are at work. We have also a means for accounting for the waste or idle time of workmen. So also we have automatic means for distributing upon the basis of the workmen's time any part of the overhead expenses or burden, and there is included automatically in the burden thus to be distributed the wages which must be paid to idle men during any one of the productive periods. So also the expense to which a factory organization is put in maintaining and running its machines is automatically charged against the various jobs upon which the machines are put to work, all in accordance with scientific data and conclusions which may be drawn once and for all by the accountant and which may be changed or varied from time to time at his direction. The expense directly incurred on account of the machines is, as I have explained, higher when the machine is running than when it is idle, and the time of the machines is automatically charged against the jobs at different rates, the changing of the occupied rate to the running rate, or vice versa, being accomplished automatically by the machine itself and with no attention whatever on the part of the operator. Furthermore, any expenses which from a scientific analysis are more properly to be charged as machine burden rates than as machine rates or wages, are automatically handled through the burden rates with which the circuits of the various machines are saddled.

My invention provides a set of registers for the cost account of each job, so that the analysis of the various items of cost will appear in connection with each job. Thus, there is assigned to each job account a register of workmen's wages and a register of burden distributed on the basis of workmen's time. There is also a machine wage register and a register of the burden costs distributed on the basis of machine time. Various totals and differences are automatically indicated by registers variously connected in circuits, as will more fully appear.

It will be noted that Fig. 2 follows in a general way the outline of Fig. 1, there being, however, additions necessary to illustrate the accounting of machine wages and burden. In explaining this figure I shall refrain so far as possible from repeating the detailed description of parts already covered in connection with Fig. 1; so also I shall not place upon Fig. 2 duplicates of all of the reference characters on Fig. 1. The identity of the parts will readily appear, however, from a comparison of the drawings themselves. Fig. 2 indicates registers for accounting six jobs $J^1$, $J^2$, * * * $J^6$. As indicated, in connection with job 1 there are four registers assigned to each job, the first $JW^1$ taking account of the men's wages, the second, $JB^1$, taking account of the men's burden rates or costs, a third, $JMW^1$, taking account of the machine wages and a fourth, $JMB^1$, taking account of the machine burden costs. At $W^1$, $W^2$ and $W^3$ are indicated three of the workmen's wage registers of Fig. 1, the circuit of each such register terminating at one end in a man's rate plug, as, for example, $MRP^1$, and at the other end after passing through the commutator segments and brushes in the sleeve contacts of job plugs, such as $JP^1$. Each such circuit is controlled by a workman's switch $Sw^1$, as in Fig. 1, and as in Fig. 1 also each individual workman's circuit is provided also with a burden rate plug, as, for example, $BP^1$. The rate controlling plugs are adapted for insertion in jacks of strips connected with a direct rate controller DRC, as in Fig. 1. Except as for the routing of the impulses flowing through these individual circuits after they reach the spring jacks connected with the job registers, I do not believe it will be necessary to repeat the detailed description given with respect to these parts as illustrated in Fig. 1.

Coming now to the consideration of the mechanism for handling the machine wages and burden, it may be said at the outset that the construction and mode of operation is very much like that explained in connection with the workmen's wages and burden rates. At each machine is placed a key or lock controlled switch adapted to be closed or opened at will by the foreman or superintendent. Three such machine switches or keys are indicated at $MK^1$, $MK^2$ and $MK^3$, the last of these being shown in the closed position. Each machine is provided also with a running switch $RSw^1$, $RSw^2$ or $RSw^3$. Without stopping now to explain in detail the construction and mode of operation of these running switches be it said that the contacts of each are automatically closed when the machine runs and automatically opened when the machine stops running, the opening and closing of the switch contacts being under the control of some vital part of the machine, as, for example, the main spindle or some feed screw. On account of the two wage rates which are assigned to each machine it is necessary to provide two circuits. The circuit for the occupied rate of machine No. 1 may be traced from the occupied rate plug ORP¹ through a wire which leads to one of the upper pair of contacts of the machine key MK¹; thence when these contacts are closed the circuit may be traced through the electromagnetic motor mechanism of the machine wage register M¹ to a segment of the wage commutator WC¹. When the brush of this commutator makes connection with that segment, the brush of the commutator WC² connects with a corresponding segment whereby a path for current may be traced through a wire leading to the tip contact of the machine job plug MJP¹. The circuit which controls the impulses of the running rate may be traced from the plug RRP¹ through a wire which leads first to a contact of the running switch RSw¹, and thence when this switch is closed through the lower pair of contacts of the key MK¹; thence through a wire which leads to a segment of the burden commutator BC¹; thence when the associated brush is in contact with this segment to the brush of the commutator BC²; thence from the segment of this secondary commutator, with which the brush is in contact, to the tip of the machine job plug MJP¹.

The construction and mode of operation will perhaps be made more clear by the consideration of an example: Assume that machine No. 1 is a lathe which the accountant has determined shall have an occupied rate of 12¢ per hour, a running rate of 42¢ per hour and a burden rate of 8¢ per hour. The plugs which form the terminals of the circuit assigned to this machine will be inserted in the rate controlling spring jack as follows: The occupied rate plug ORP¹ will be inserted in a spring jack of the strip which twelve times per hour is connected in circuit by contacts of the direct rate controller. The running rate plug RRP¹ is inserted in a jack of the 30 cent strip. The machine burden plug MBP¹ is inserted in the strip of the burden rate spring jacks which, normally, is connected with a contact of the direct rate controller to which connection is established eight times per hour. It will be noted that the running rate plug is not inserted in a 42¢ jack but rather in a 30¢ jack, this being for the reason that the running rate impulses are added to the occupied rate impulses to produce the running rate total of 42. The plug is therefore inserted in a jack of a strip to which there is permitted to flow 30 impulses per hour, the difference between 42 and 12. As in Fig. 1 the battery BS is the source of the current for providing the burden impulses. The battery WS serves as a source for the wage impulses. The impulses are controlled by mercury switches, as in Fig. 1, the Geneva gear serving step by step to advance the direct rate controller and the brushes of the wage and burden commutators. When any machine is idle and unassigned to any job the key switch MK will be open. When, however, the machine, as for example No. 1, is assigned to a job, the key switch MK¹ will be closed by the foreman. It will also be the duty of the foreman or superintendent to see that the machine job plug MJP¹ is inserted in one of the spring jacks leading to the group of registers assigned to the job to which the machine is assigned. If, for example, the machine is assigned to job No. 1, the plug MJP¹ will be inserted in a jack of the strip JJ¹. Each job jack has two contacts—a sleeve contact JJs and a tip contact JJt. The flexible conductor leading to the plug MJP¹ is electrically connected with the tip of this plug, wherefore, the plug when inserted in the spring jack establishes connection with the tip contact JJt. With this explanation as to the insertion of the plugs in the appropriate spring jacks we may trace the flow of current impulses. First, when the machine has been assigned to a job but is still being set up or occupied, 12 impulses per hour will flow from the spring jack connected with the direct rate controller through the upper pair of springs of the machine key MK¹; thence through the machine wage register M¹; thence through the segment of the commutator WC¹; the brush of that commutator then in connection with the segment; thence to the brush of the commutator WC²; thence from the segment of this secondary commutator to the tip of the plug MJP¹; then to the tip spring of a spring jack in the strip JJ¹; thence through the wire to the junction point between the electromagnetic motor mechanisms of the registers JMB¹ and JMW¹; thence through the electromagnetic mechanism of the register JMW¹, through the electromagnetic motor mechanism of the machine wage total register MWT; the right-hand motor mechanism of the total machine charge register TMC; thence through the motor mechanism MWT², which operates in conformity with the total of the machine wages in contributing toward the control of the regulating frame RF, and thence to the negative pole of the battery WS. It will, of course, be understood that the motor mechanisms of registers included in this circuit will be actuated to an amount corresponding with 12¢ per hour.

When the machinist or operator causes the machine No. 1 to begin running, the running switch RSw¹ is immediately closed. Thereupon a circuit may be traced as follows for the flow of 30 impulses per hour: from a spring jack of the 30¢ strip connected with the direct rate controller, through the plug RRP¹, through the switch contacts of the running switch RSw¹; thence through the closed lower pair of contacts of the machine key MK¹; thence through the segment of the burden commutator BC¹, the brush of this commutator, the connecting shaft, the brush and commutator segment of the commutator BC²; thence to the tip of the machine job plug MJP¹ to the tip contact of a jack of the strip JJ¹; thence through the wire to the junction point between the motor mechanisms of the registers JMB¹ and JMW¹; thence through the motor mechanism of the register JMW¹ and back to the negative pole of the battery WS, over the circuit just traced.

It is to be noted that the segments marked No. 1 of the selecting commutators occupy the same angular position. The brushes of the wage commutators are, however, one step in advance of those of the burden commutators. The result, of course, is, that the No. 1 machine circuit is first closed through the segments of the wage commutators, and one step later when the circuit through the wage commutators has been opened a circuit through the burden commutators is closed. The result of this staggered angular position of the wage and burden brushes is that the full number of closures of the circuit to the running rate plug will result in the flow of impulses independent of those impulses which flow through the occupied rate plug ORP¹, and this, notwithstanding the fact that the disks of the direct rate controller are so arranged that no circuit of the closure to a rate controller contact of low rate is made without effecting simultaneously the closure of a circuit to the rate controller contacts of very high rate.

Coming now to a consideration of the flow of impulses for accounting machine burden, we may trace a circuit from the burden plug MBP¹ through the wire leading to the lower pair of springs, now closed, of the machine key MK¹; thence through the wire leading to commutator segment No. 1 of the burden commutator BC¹; thence through the brushes of this commutator and a secondary burden commutator BC² to segment No. 1 of this secondary commutator, and thence to the tip of the machine job plug MJP¹, this plug being inserted in a jack of the strip JJ¹. A circuit may be traced from the tip contact of such a spring jack to the junction point between the motor mechanisms of the registers JMB¹ and JMW¹; thence through the electromagnetic mechanism of the register JMB¹ and the wire leading to the motor mechanism of the machine burden total register MBT; thence through the left-hand motor mechanism of the total machine charge register TMC; thence through the motor mechanism BT to the negative pole of the battery BS. The impulses flowing over this circuit are supplied by the battery BS acting in conjunction with the mercury burden brush BB. Eight times in every hour the auxiliary contacts of the direct rate controller will afford an opportunity for the flow of a current impulse over the circuit just traced.

It is to be noted that the flow of the machine burden rate impulses is not dependent upon the condition of the running switch RSw¹. The machine burden impulses will flow whenever the machine key MK¹ is closed, assuming, of course, that the plug terminals of the circuits are inserted in appropriate spring jacks. Whenever a machine assigned to any job stops running, the running switch RSw¹ is automatically opened by the stoppage of the machine, whereupon the circuit for the flow of the 30 current impulses per hour is interrupted, the circuits over which flow the 12 impulses per hour and also the 8 impulses per hour corresponding respectively with the machine wage and the machine burden, remaining closed, with corresponding operation of the registers connected in these circuits.

It will be understood that the machine job plugs will be, in all cases, plugged into a job jack of the strip assigned to the job upon which the machine is at work. While each machine is shown in Fig. 2 to be provided with a machine key which serves to open the individual circuit of the machine when idle, it will be apparent that the foreman may, if he choose, plug the machine job plug MJP¹ into a jack of the waste wage strip WWJ, such a connection of the terminal of the individual machine circuit corresponding with idle or waste time for machine No. 1. While the individual machine circuits are periodically closed through certain segments of the selecting commutators, the individual workman's circuits are closed at other periods through other segments. It will be understood that the impulses corresponding with a workman's rate of wages and of burden will reach the sleeve contact of the plug terminal of an individual circuit, as, for example, the sleeve contact of job plug JP¹. From this point the current impulses may be traced through the sleeve contact of the jack of a strip in which the plug is inserted,—for example, a jack of the strip JJ¹. From the sleeve contact JJs of such a jack current impulses may be traced to the junction point between the motor mechanisms of the registers JB¹ and JW¹. The wage impulses will here pass to the right through the motor mechanism of the register JW¹; thence through the wire leading to the motor mechanism of the job total register of workmen's wages JTWW; thence through the motor mechanism of the total waste wage register TWW, and thence to the negative pole of the battery WS.

The burden impulses which flow to and through the sleeve contact of the workman's job plug $JP^1$ will, however, upon reaching the junction point between the motor mechanisms of the registers $JB^1$ and $JW^1$ pass to the left and thence through the wire leading to the motor mechanism of the workmen's burden total register WBT; thence through the wire to the burden total register BT, and thence to the negative pole of the battery BS. I believe that the detailed explanation previously made will suffice for an understanding of the analysis of costs which is developed in the registers shown in this Fig. 2. I shall not, therefore, elaborate upon this phase of the features peculiar to Fig. 2. It will be understood, of course, that the total cost of job No. 1 is the total of the readings of the four registers assigned to job No. 1. So, also, the four registers assigned to each of the other jobs will show the analysis of the items of cost of each job, and the total cost of each job will be the sum of the readings of the four registers assigned to each such job. Each job may have assigned to it in addition a totalizing register if desired, this latter automatically to sum the indications of the four job registers. The job total register of workmen's wages JTWW indicates at all times the sum of the workmen's wages earned on productive jobs—that is to say, this register sums the workmen's wages, except for waste wages. The total of the workmen's wages, including waste wages, is indicated in the register TWW. The total of machine wages earned on productive jobs is shown in the register MWT. If machine job plugs as well as workmen's job plugs are at times inserted into the waste wage jacks WWJ then the total waste wage register TWW will indicate the total of all waste wages, whether of machines or workmen. The total of the machine burden costs as distributed to the jobs is indicated in the register MBT. The total of the workmen's burden costs as distributed to the jobs is indicated in the register WBT. The impulses flowing through these two burden totalizing registers flow also through the motor mechanism BT, which, therefore, takes account of the total burden cost, and in connection with this motor mechanism I have indicated register wheels to indicate the means for reading the total burden at this point.

The total of machine charges, whether of wages or of burden, is easily secured by means of the two motor mechanisms assigned to the register TMC, these motor mechanisms acting through a differential gear to drive the numeral wheels of the register. It will, of course, be understood that many other totals and differences can be indicated by one or the other of the arrangements here shown.

The regulation or adjustment of the burden rates, both workmen's burden rates and machine burden rates, is accomplished in a manner corresponding closely with that already described in connection with Fig. 1. It will be noted that the current impulses corresponding with waste wages flow in Fig. 2 as in Fig. 1 through the motor mechanism of the waste wage burden register WWB, wherefore, waste wages are made to contribute to the accruing burden. All to the left of the regulating differential RD is, therefore, in Fig. 2 just as it is in Fig. 1. On the right-hand side of the regulating differential RD there is a slight complication. Since the plan of accounting to which the system of this Fig. 2 is adapted requires the distribution of general or overhead expenses, partly as machine burden and partly as workmen's burden, it will be necessary to actuate the right-hand primary gear of the regulating differential in conformity with the sum of the distributions made on these various bases. To this end the electromagnetic motor mechanisms BT and $MWT^2$ are made to drive gears whose motion is totalized through appropriate differential gearing to drive the right-hand primary gear of the regulating differential at a rate corresponding with the sum of the distributed burden of both kinds and the distributed machine wages. If, as in Fig. 1, there is any variation of the overhead expenses from those estimated, or if waste wages becomes a factor to be distributed as burden, the regulating differential will automatically adjust the regulating brushes connected with the burden spring jacks to adjust the burden rates up or down as may be required to maintain a counterbalance of the distributed costs with respect to the actual expenses.

At DOR I have indicated a register geared to the right-hand primary gear of the differential RD. This register is, therefore, actuated in conformity with the total of the distributed overhead charges. The reading of this register will, of course, correspond approximately at all times to that of the register TAB, to which is assigned the duty of totalizing the accruing burden.

While I have endeavored, in illustration, to show and describe means embodying the principles of my invention, it will be at once apparent that the lay-out for any particular factory or business must be determined by the conditions of that business. In some lines there will be a large number of workmen and a small number of machines. In a screw machine department or in a cotton mill there will be a large number of machines to each workman. So also in one factory certain totals or distributions or analyses of costs will be required, while in another business the accounting results must be on a wholly different plan. I believe, however, that the various features of my invention herein disclosed are capable of adaptation to a wide variety of conditions, and that an intelligent grasp of the principles and mechanisms herein shown and described will enable one who becomes skilled in this field of endeavor to secure automatically a wide variety of very useful data and information as to production costs, and this too without the expenditure of a prohibitive amount of clerical time and labor.

As an illustration of the adaptability of certain of the features heretofore disclosed I may call attention to the spring jacks which are connected in multiple circuit with the contacts of the workmen's job plugs, as, for example, JP$^1$. It will be noted that the conductors leading to the tip and sleeve contacts of this plug are connected respectively with tip and sleeve contacts of supplemental spring jacks SJP$^1$. The utility of these is as follows: A particular machine, as, for example, machine No. 1, may be assigned permanently to workman No. 1. This workman may use no other machine and the machine may be used by no other workman. In this case it is but necessary to insert the machine job plug MJP$^1$ in the supplemental spring jack SJP$^1$ of the workman's job plug JP$^1$, whereupon the foreman or superintendent may disregard the plugging of the machine job plug into a job jack assigned to the job upon which the machine may be at work. This is so because the plugging of the workmen's job plug JP$^1$ into a spring jack of the registers assigned to the job upon which the workman is at work will automatically complete also the circuit connections for the machine circuit. To illustrate by an example—assume the machine job plug MJP$^1$ to be inserted into one of the spring jacks SJP$^1$, and assume, also, the workmen's job plug JP$^1$ to be inserted in one of the jacks JJ$^1$. It will be obvious that with this plugging of the jacks the impulses coming in through the wire to the machine job plug JP$^1$ will flow from the tip contact of this plug to the tip contact of the jack SJP$^1$; thence to the tip contact of the plug JP$^1$; thence to the tip contact of the jack JJ$^1$; thence through the wire to the junction point between the registers JMB$^1$ and JMW$^1$, and thence over the circuit for the machine impulses, as previously traced. The workmen's impulses will, on the other hand, reach the sleeve contact of the plug JP$^1$, where they will flow through the sleeve contact of the jack JJ$^1$, and thence to the junction point between the registers JB$^1$ and JW$^1$, where they will divide according to burden and wages and take the routes previously traced to the sources BS and WS respectively.

I have spoken of the possibility of establishing connection between the machine job plug JP$^1$ and a waste wage jack of the strip WWJ in case this method of handling idle time of machines should seem desirable from an accounting standpoint. It will be understood, of course, that the possibility for the proper electrical connection of the tip contact of the plug MJP$^1$ with the contact of the waste wage jack WWJ must in this case be afforded. The diagrammatic symbols in the drawing would indicate that the waste wage jacks contained only sleeve contacts, and it has been explained that it is the tip contacts of the machine job plugs in which the machine circuits terminate. The multiple connection of a tip contact of the waste wage jack would serve to overcome any difficulty on this score. Obviously any number of machine plugs may be inserted in spring jacks connected with a workman's job plug; so, also, if desired, it is possible to assign permanently to a skilled workman not only one or more machines but one or more workmen who are mere helpers or laborers. If these helpers or laborers work always for the same skilled workman it will be convenient to insert the plug terminals of their circuits in spring jacks multiply connected with the job plug of the skilled workman. With this arrangement it is necessary for the foreman or superintendent to attend only to the proper plugging of the job plug of the skilled man. The rest will take care of itself by virtue of the multiple connection with the skilled workman's job plug.

I have now outlined the more simple system of Fig. 1 and the more complicated system of Fig. 2. There remains, however, to be explained in more detail the so-called accruing burden registers ABR of both of these figures, and also the details of the running switch RS$w^1$ of Fig. 2.

The details of the accruing burden register are shown in Figs. 3, 4, 5, 6 and 7 and in Figs. 8$^1$ to 8$^{200}$, inclusive. Before proceeding to the detail account of this mechanism let it be said (having in mind the disclosure of Fig. 1) that the accruing burden register is a device which can be set to cause the steady rotation of a driving gear at a predetermined rate. Power is supplied from the main shaft to the accruing burden register, and this register is so made that the position of the setting register will determine the gear ratios through which the translation of power takes place to cause the rotation of the driving gear.

In the detail figures showing the accruing burden register it may be assumed that the setting register diagrammatically indicated at SR is the register SR of Fig. 5; that the burden counting register BCR of Fig. 1 is the register BCR of Figs. 4 and 5; that the setting crank SRC of Fig. 1 is the crank SRC of Fig. 3; that power is delivered to the accruing burden register through the shaft 10 of Figs. 3 and 5, and that the driving gear DG of Fig. 1 is mounted upon the spindle 11 of Figs. 3, 4 and 6. The shaft 10 of each accruing burden register is driven by bevel gear connections with the main shaft MS, as shown in Fig. 1.

Bearing in mind that it is the general object of the accruing burden register to cause the shaft 11 to run at any required rate per hour while power is delivered to the shaft 10 at a constant and steady rate, it may be explained at the outset that I depend upon a series of differential gears for totalizing a plurality of individual motions and delivering the sum of these motions to the shaft 11. The differential gears for totalizing these motions operate on the same general principle as do the differential gears shown in Fig. 1 for totalizing the motion delivered by the three accruing burden registers and delivering the sum of this motion to the overhead shaft OS. The mechanical arrangement of the differential gears is, however, a little different. Near the middle of Fig. 3 parts are broken away and shown in cross-section to illustrate the construction of one of the ten differential gears which serve to deliver the proper motion to the hollow shaft 11. Passing through all of the differential gears is a fixed shaft or spindle 12, and all of the rotating parts are loosely mounted upon this shaft. Each differential gear comprises two primary gears and a common gear with suitable pinions mounted in the housing of the common gear and meshing with the primary gears. The primary gears of the differentials are formed integrally with hubs or bushings, each of which connects the right-hand primary of one differential with the left-hand primary of the next higher differential. Thus, the left-hand primary gear 13 of the differential, which is fully shown in cross-section, is connected by the hub or bushing 14 with the right-hand primary gear 15 of the next differential to the left of that shown fully in cross-section. The right-hand primary gear 16 of the differential in cross-section is, in like manner, connected by means of the hub 17 with the left-hand primary of the next differential gear to the right. The parts 13, 14 and 15 are fastened together to become for all practical purposes one piece of metal in the form of a small tube with a gear at either end. The tube and gears are bored with a hole fitting loosely upon the shaft 12, a very small length of which can be seen between the primary gears 13 and 16. The common gear of the differential shown in cross-section is in the form of a worm wheel 18 to which is riveted or otherwise attached a hollow housing 19, this housing rotating with the worm gear. The worm wheel and housing are bored with holes of a size adapting them to fit loosely about the hubs or bushings connecting the pairs of primary gears. The worm gear and its housing are therefore capable of rotation upon the bushings 14 and 17. Between the worm wheel 18 and its housing 19 are mounted the spur pinions 20 and 21, these being loosely mounted on small spindles fixed in position in the worm wheel and housing, but not shown in the drawings. The teeth of the spur pinions 20 and 21 are in mesh with one another at their inner ends. The outer ends of the teeth of the spur gear 20 are in mesh with the primary gear 13, while the outer ends of the teeth of the spur pinion 21 are in mesh with the teeth of the primary gear 16. This being the construction, it will be apparent that if the worm wheel 18 is held stationary a motion coming from the left will be transmitted through the differential gear without change; that is to say, if the primary gear 15 with its bushing 14 and the primary gear 13 are in rotation, the primary gear 13 being in mesh with the spur gear 20 will cause the rotation of the latter upon its spindle or journal in the housing 19. This pinion 20 being in mesh with the pinion 21 will cause the rotation of the latter, and this pinion 21 being in mesh with the primary gear 16 will cause this primary gear 16 to rotate at the same rate as did the primary gear 13 from which the power was derived, but in the opposite direction. It will be seen that the bushing $14^1$, which is a part of the left-hand primary of the differential gear at the left-hand end of the set, is fixed against rotation in the frame of the machine, which frame appears in cross-section at 22, the pin 23 serving the purpose of fixing this bushing and its primary gear against rotation. The result of the construction is, therefore, that the rotation of any primary gear to the right of that which is fixed will be transmitted on up the line to the hollow shaft 11, which is, in fact, an extended bushing upon which the primary gear at the extreme right-hand end of the whole series is rigidly mounted.

Each of the primary gears, with the exception of the fixed gear at the extreme left, may also have imparted to it a motion of revolution which is not derived from the primary gear of the same differential. Thus, for example, let it be assumed that the primary gear 13 of the differential shown in cross-section is held stationary, and that the worm wheel 18 is being driven in the direction of the arrowhead shown upon this worm wheel; the spindles or axes of the spur pinions 20 and 21 will be carried around and around the central axis provided by the shaft 12. The pinion 20 will climb upon the periphery of the primary gear 13, thereby transmitting the rotational motion to the spur pinion 21, the inner ends of whose teeth are in mesh with those of the spur pinion 20. The rotation of the pinion 21 will cause a rotation of the primary gear 16 with which it is in mesh. The result of one revolution of the worm wheel 18 will be, therefore, to cause two revolutions of the primary gear 16. Assuming now that the worm wheels of all of the differential gears to the right of that under discussion are held stationary, it will be apparent that the motion imparted to the primary gear 16 will be transmitted on up the line to the shaft 11.

In considering the driving of the primary gear 16 by the worm wheel 18 we assumed the primary gear 13 to be held stationary. The result is not substantially different, however, if the primary gear 13 is also in rotation. Any rotation of the gear 13 is transmitted through the pinions 20 and 21 to the primary gear 16 regardless of whether the housing 19 is in rotation or not. If the housing 19 is being driven by the worm wheel 18 its motion will be added to any that comes in from the left through the bushing 14 and the primary gear 13, with the result that the rotation of the primary gear 16 will correspond with the sum of the motion which comes into the differential from the left and the motion which is imparted directly to the worm wheel of the differential itself. In order that this summation of all the motions of all the differential gears will take place and cause a rotation of the final driving shaft 11 in conformity with the total of the motions of all of the worm wheels of the various differential gears, it is but necessary that the driving of alternate differential gears shall be in opposite directions. This is all as shown by the arrowheads upon the housings of the various differential gears.

It may be foreseen now perhaps that if means is provided for driving the worm wheels of the various differential gears at differing rates—one at a rate corresponding with 1¢ per hour, another at a rate of 2¢ per hour, another at a rate of 4¢ per hour, etc., it will be possible to determine the rate of rotation of the driving shaft 11 in conformity with any required number of cents per hour. This, then, is what I do: I provide gearing adapted to drive the worm or common wheel of each differential at a particular rate, and in connection therewith a clutch or other controlling mechanism for throwing any of the mechanisms for driving common wheels of differentials in or out of service. I shall explain the details of this mechanism more fully. It will be seen that there is a worm 24 in mesh with each worm wheel of a differential. The alternate worms are at the front of the line of differential gears and the intervening worms at the rear thereof, as illustrated in Figs. 3 and 5. These worms are in cylindrical bushings or tubes 25, each loosely mounted upon a driving spindle 26. It is the driving spindles 26 which are caused to rotate constantly at differing rates corresponding with differing rates of accruing burden. At the bottom of Fig. 3 are indicated the relative rates at which the driving spindles 26 are caused to rotate. It will be seen that they run at rates corresponding with 1, 2, 4, 5, 10, 20, 40, 50, 100 and 200 cents per hour, and they might go on indefinitely as much farther as one chooses. Upon each of the driving spindles 26 is a collar or clutch member 27 provided with saw teeth adapted to register with corresponding teeth at the end of the associated worm or worm bushing 25. It will be apparent that when any clutch member 27 is raised into its upper position it will engage the teeth of the associated worm, thereby causing the worm which is loosely mounted upon the driving spindle 26 to rotate in conformity with the spindle 26. When the clutch member 27 is dropped into the lower position, as shown in connection with all of the clutches in Fig. 3, the driving shaft 26 will rotate, but without causing a corresponding rotation of the worm which is loosely mounted thereupon.

I think it will now be apparent that it must be the function of the setting mechanism to throw in or out of engagement the appropriate clutch members. It will be seen that each of the collars or clutch members 27 is provided with a groove 28 engaged by the forked end 29 of a shifting lever 30. On account of the staggered position in which the worms and their driving shafts are mounted, it is necessary to reverse the alternate shifting levers 30, half of them being provided with pivots 31 at the front and the other half with pivots 32 at the back.

The control of the shifting levers, and thus of the associated clutches, is effected by a series of cams, one for each shifting lever, each shifting lever being provided with a hardened roller 33 for riding on the periphery of the associated cam. The ten cams of the particular embodiment of my invention herein described are illustrated in detail in Figs. $8^1$ to $8^{200}$, inclusive. The rollers 33 of the shift levers 30 are indicated in these Figs. $8^1$ to $8^{200}$. All of the cams are shown in these Figs. $8^1$ to $8^{200}$ in their normal or zero position. It will be noted that all of the cam rollers 33 are in their lower position conforming with a disengaged condition of the associated clutch. The cams are in Figs. 3 and 5 marked with reference letters corresponding with the ordinals of the figures in which they are shown in detail. Thus the 1¢ cam in Figs. 3 and 5 is marked with the reference letter $8^1$; the 2¢ cam is not visible in either of the figures; the 4¢ cam is, however, marked $8^4$; the 10¢ cam is marked $8^{10}$; the 40¢ cam, $8^{40}$, and the 100¢ or $1.00 cam is marked $8^{100}$ in Fig. 3. Whenever any of these cams is turned into a position in which an elevation on the periphery engages the associated roller 33 of a shift lever the corresponding clutch members are thrown into engagement with one another, whereby the corresponding driving shaft 26 may cause the rotation of the associated worm and thus the worm wheel of the corresponding differential. It is the function of the setting crank SRC to turn the cams into positions such that they will throw their associated clutches into engagement in proper sequence and in proper combinations. The first four cams—that is, the cams $8^1$, $8^2$, $8^4$ and $8^5$—are all mounted directly upon the primary setting spindle 34, the crank SRC being attached also to this spindle. The angular disposition of the cams is as indicated in Figs. $8^1$ to $8^5$. It will be apparent, therefore, that a one-tenth revolution of the primary setting shaft 34 in the direction of the arrows on Figs. $8^1$ to $8^5$, inclusive, will advance the first cam $8^1$ to a position in which the cam roller 33 will be elevated to throw in the clutch on the 1¢ driving shaft 26. None of the other cams will, however, be advanced far enough to elevate its clutch lever. When, however, the setting spindle 34 is turned through an additional one-tenth revolution in the same direction, the elevated portion of the periphery of the cam $8^2$ will engage its roller 33 operatively to connect the worm of the 2¢ shaft with that shaft. A further one-tenth revolution of the setting shaft 34 will bring the second elevation on the periphery of the 1¢ cam into a position to raise its roller 33, but here the elevation of the 2¢ cam will still be found in a position to maintain the elevation of its cam roller. The result will be that we shall have in operative engagement with their driving shafts the worms, both of the 1¢ driving shaft and of the 2¢ driving shaft. An additional one-tenth revolution of the setting shaft—that is, a four-tenths revolution of that shaft, from the zero position will bring the elevation of the 4¢ cam $8^4$ into a position to elevate its cam roller; but here a depressed portion of the periphery of both the 1¢ cam and of the 2¢ cam will have been reached so that the 4¢ worm will alone be in operative connection with its driving shaft. A five-tenths revolution of the setting shaft will bring into play the elevated portion of the periphery of the 5¢ cam, while the cam rollers of the 1¢, the 2¢ and the 4¢ clutches will all be in their lower or inoperative positions. A six-tenths revolution will again bring an elevated portion of the periphery of the 1¢ cam into play in connection with the continuing elevation of the 5¢ cam, thus to produce rotation of the 5¢ worm and also of the 1¢ worm, the differential gears serving to sum the motions of the two worms in the manner already described. When the setting shaft is turned eight-tenths of a revolution from its initial position, the elevation of the clutch levers of the 1¢ driving shaft, the 2¢ driving shaft and the 5¢ driving shaft, is caused simultaneously, thereby to cause the rotation of the final driving shaft 11 at a rate corresponding with an accruing burden of 8¢ per hour. When the setting shaft has been turned nine spaces the 4¢ and 5¢ driving shafts will contribute their motions to the differential gears through their final driving shafts 11.

We come now to a carrying operation, for which it is convenient to arrange. The 10¢, 20¢, 40¢, 50¢, 100¢ and 200¢ cams are all rigidly mounted in relative angular positions, as indicated in Figs. $8^{10}$ to $8^{200}$, inclusive, upon a secondary setting spindle 35. This spindle is hollow and is slipped over the primary spindle 34. They are, however, rotatably independent of one another, the smaller shaft serving simply as a convenient journal for the larger shaft. While the setting crank SRC directly controls the rotation of the setting shaft 34, it controls the position or setting of the secondary setting shaft 35 through the intervention of a Geneva carrying gear. The details of this are best shown in Fig. 5, where is indicated a one-tooth carrying wheel 36 rigidly mounted upon the primary setting shaft 34. The carrying tooth of this wheel coöperates with a Geneva star wheel 37, which is mounted upon a small countershaft 38. At the farther end of this countershaft is mounted a small spur pinion 39 in mesh with a spur gear 40, rigidly mounted upon the left-hand end of the secondary setting spindle 35. When, therefore the setting crank SRC is moved from its ninth position into the tenth, or initial position,—that is to say, when it takes the last step of a full revolution, the carrying tooth of the wheel 36 engages a notch in the periphery of the star wheel 37 to cause a one-space rotation of the shaft 38 and its spur gear 39, this, of course, causing a corresponding degree of revolution of the spur gear 40 and the secondary setting shaft 35, dependent upon the gear ratios. These are made such that each 1-step advancement of the star wheel 37 causes one forty-second of a complete revolution of the secondary setting shaft 35, and, of course, of all of the setting cams carried thereby.

Now let us see what the effect of this construction may be. We have seen how the step-by-step rotation of the setting shaft SRC causes the effective connection first of the 1¢ driving worm, then of the 2¢ driving worm alone, then of both the 1¢ and the 2¢ worms, then of the 4¢ worm alone, and so on, a series of combinations from 1¢ to 9¢. The movement of the primary setting shaft from the 9¢ position into the 10¢ position throws out of engagement the 1¢ clutch, the 2¢ clutch, the 4¢ clutch and the 5¢ clutch, but it brings into play the Geneva carrying mechanism to cause a one-space revolution of the secondary setting shaft 35 in the direction of the arrows shown in Figs. $8^{10}$ to $8^{200}$, inclusive. Such a one forty-second advancement of this secondary shaft moves the cam $8^{10}$ into a position such that its roller 33 will be elevated. This, of course, throws the 10¢ clutch into engagement with the 10¢ worm to cause the driving of that worm by the 10¢ driving shaft. The Geneva gear operates to hold the countershaft 38, and, therefore, the secondary setting shaft 35 in this 10¢ position during the succeeding 9-space advancement of the primary setting shaft. Thus, while the 10¢ cam remains stationary in position to maintain the operation of the 10¢ worm, the primary setting cams come into play one after another and in appropriate combinations to cause a driving through the differential gears corresponding first with 11¢, then 12¢, then 13, 14, 15, 16, 17, 18 and 19¢ per hour. Here again when the setting crank is moved from the 19¢ position into the 20¢ position, a carrying takes place through the Geneva gear to cause a further one-space advancement of the secondary setting shaft. Such an advancement of an additional one forty-second of a complete revolution brings an elevated portion of the periphery of the 20¢ cam into play to throw the 20¢ clutch into engagement with the 20¢ worm, while the 10¢ cam permits its clutch to drop into the inoperative position. Now again follow the series of positions which produce a driving corresponding with 21¢, 22¢, 23¢, etc., just as may be required. When the 29¢ position has been reached and a further one-step advancement is given to the primary setting shaft by means of the setting crank, the Geneva gear will come into play to advance the secondary shaft to a position in which both the 10¢ cam and the 20¢ cam will be effective to maintain the operation of the 10 and 20¢ worms. Without following out the operation in further detail, it will be understood that the primary and secondary cams are so arranged in connection with the Geneva carrying mechanism that any amount from 1¢ up to the capacity of the machine, which, in this case, is $4.19, may be set up by the setting mechanism to cause a corresponding operation of the driving worms.

We have not as yet considered the means for causing the steady rotation of the driving shafts 26, one at a rate corresponding with 1¢ per hour, another at a 2¢ rate, and others at rates corresponding with 4¢, 5¢, 10¢, 20¢, 40¢, 50¢, 100¢ and 200¢ per hour. It will be seen that the driving shafts 26 terminate in a gear box 41 at the top of the machine. Here each is provided with one or more gears, and these gears are in mesh with one another in ratios corresponding with the rates of driving of the various driving shafts. Each of the driving shafts 26 is in Fig. 4 so designated by reference character, below which in each instance is placed in parentheses the rate of driving. The 200¢ driving shaft is extended above the majority of the others, and upon the top of this shaft is mounted a crown gear 42, to which power from the shaft 10 is transmitted through the shiftable extension 43, upon which is mounted the units driving pinion 44. A pinion 45 immediately below the crown gear 42 transmits motion through an idler 46 to a gear 47 upon the 100¢ spindle 26. The ratio between the pinion 45 and the gear 47 is 1 to 2; wherefore, the 100¢ shaft 26 receives but 100 revolutions for every 200 revolutions of the 200¢ shaft 26. The gear 47 is likewise in mesh in a 4 to 10 ratio with a gear 48 mounted upon the upper end of the 40¢ driving shaft 26. The result is that this driving shaft receives but 40 revolutions for every 100 revolutions of the 100¢ shaft and 40 revolutions for every 200 revolutions of the 200¢ shaft. Below the gear 48 on the 40¢ driving shaft 26 is a pinion 49 in mesh with the gear 50 upon the 10¢ driving spindle 26, the gear ratio here being 1 to 4. The result is that the 10¢ driving shaft receives but 10 revolutions for every 40, 100 or 200 revolutions of the other driving shafts thus far considered. The pinion 45 on the 200¢ driving shaft is directly in mesh with a gear 51 mounted upon the 50¢ driving shaft 26, the ratio here being 1 to 4.

Without stopping to follow through all the gears and pinions required it will be obvious that the driving shafts will be rotated at the rates to which reference has already been made.

My invention provides means whereby the capacity of the accruing burden register may be multiplied if desired. It will be noted that the 20¢ driving spindle and the 2¢ driving spindle fall directly in line with the 200¢ driving spindle. Not only is the 200¢ spindle provided with a crown gear, but the 20¢ driving shaft and the 2¢ driving shaft are also provided with crown gears 52 and 53 respectively. Conforming with this arrangement there are mounted upon the slidable extension 43 of the driving shaft 10 two extra and alternate driving pinions 54 and 55 respectively. The knob 56 at the right-hand end of the extension shaft 43 is provided for the purpose of setting the extension shaft 43 in any of its three positions, the spring detent 57 shown in Figs. 3 and 7 serving to hold the extension shaft in any of the three positions in which it is placed until forced into another position by the operator. Since the driving shaft 10 runs always at a certain fixed rate the 200¢ driving shaft 26 will run at a 200¢ rate when the pinion 44 is in mesh with the crown gear 42. When, however, the pinion 44 is thrown out of mesh and the pinion 54 is thrown into mesh with the crown gear on the 20¢ driving shaft 26, the transmission of power will be reversed through the gears connecting the 20¢ shaft with the 200¢ shaft, and with the result furthermore that the speed of the 20¢ shaft will become ten times what it was previously. This will make what is normally the 20¢ shaft a 200¢ shaft and what is normally the 200¢ shaft will at the same time become a 2000¢ shaft; in other words, the speed of every one of the driving shafts will be multiplied by 10 and the total capacity of the machine will become $41.90 instead of $4.19. In like manner the crown gear 53 may become the driving end of the combination by effecting an operative engagement between it and the pinion 55. In this case the speed of all of the driving shafts will be multiplied 100 times above normal, with the result that the capacity of the machine will become $419.00. It may, and frequently will, be desirable, if three or more such accruing burden registers are provided for one system, as shown in Fig. 1, to set one or two of them at the high speed, one perhaps at the intermediate speed and if it is necessary another at the slowest speed.

The setting register SR is geared through the idler 58 to a gear on the primary setting shaft 34, the ratio of transmission being such that the setting register will show the amount for which the setting is made. Thus, if it be decided that an overhead charge should be distributed at the rate of $2.38 per hour, it is but necessary to turn the setting crank SRC until the setting register SR indicates $2.38. This will mean that a combination of clutches has been thrown into operative position to cause the driving of the final driving shaft 11 at a rate corresponding with a burden charge of $2.38 per hour. In like manner any other amount within the capacity of the machine may be set up on the setting register, and the final driving shaft 11 will rotate at a corresponding rate, the result in the system being as set forth in connection with Figs. 1 and 2. In order that an account may be kept of the total amount of the burden disposed of through the accruing burden register I provide the register BCR, which is geared directly through the idler 59 to the final driving shaft 11. The operation of the register BCR is, therefore, controlled by and dependent upon the total amount of revolution of the final driving shaft 11. The total amount of the accruing burden for which charge is made by the accruing burden register may be read at any time from the register BCR, while the rate at which the accruing burden register is charging burden into the system may be read from the setting register SR.

While I have spoken of the rates as based upon the hour as a unit it will, of course, be apparent that any other unit may be selected if desired; so, also, the capacity of the machine may be varied at the will of the constructor, and, to a certain extent, at the will of the accountant or other operator. The gear ratios and cam peripheries may also be varied to suit the conditions.

There is still to be described in detail the automatic running switch. This is diagrammatically shown in Fig. 9. The switch springs proper are shown at 100, 101 and 102, the motor spring 100 being adapted to be thrown to one side or the other by the insulated crank arm 103. This crank 103 is mounted upon the end of an actuating spindle 104, at the left-hand of which there is what I call a multi-ratio gear or multi-ratio differential gear. This gear is like a differential gear but yet not like it. It has the common wheel 105 in which is housed a spindle 106 upon the ends of which are mounted the climbing gears 107 and 108. These latter are of different size, as shown in the drawing. The gear 108 climbs upon the periphery of the pinion 109 which is mounted upon the end of the shaft 104. The pinion 107 climbs upon the periphery of the gear 110, which is mounted upon the end of the shaft 111. The periphery of the common gear 105 is in mesh with a driving gear 112 mounted upon the shaft or spindle 113 of the machine whose rate of wages is automatically to be changed by the running switch. At the left-hand end of the shaft 111 is an arm 114; also, loosely mounted upon the end of the shaft is a friction disk 115. Except for the fact that the spindle 111 forms a journal for the disk 115, the only connection between the shaft and the disk is through the springs 116 and 117 which connect one end of the cross-arm 114 with pins in the periphery of the friction disk. When the shaft 111 turns this way or that, one or other of the springs 116 or 117 is put under tension to drag the friction disk around behind the rotating shaft. The extent to which the disk may turn with respect to the cross-arm 114 and the shaft 111 is limited by the stop pins 118 and 119 adapted to engage the opposite end of the cross-arm. The yoke members 120 and 121 are hinged together at 122, and may be assumed to be attached to a frame at the pivot point. The clamp spring 123 holds the two halves of the friction yoke in engagement with the friction disk 115. This being the construction, the operation will now be understood. When the machine is at rest, whether merely occupied or idle, the shaft 113 is stationary. When, however, the machine runs in doing work the shaft 113 will rotate, say, for example, in the direction of the arrowhead indicated upon the shaft. This will cause rotation of the common gear 105 in the direction of the arrowhead upon the periphery of this wheel. Such rotation of the common gear will carry the spindle of the climbing gears or pinions around the axis of rotation. Such revolution of the spindle 106 acting through the gear 108 will cause a tendency to rotate the gear 109 and the shaft 104 in the direction of the arrow upon the shaft 104. This will, of course, swing the insulated crank arm 103 in the direction of the arrow 124 until the stop pin 125 is engaged. No further rotation of the gear 109 can ensue, from which results the following operation: The common gear 105 continues to rotate and the gear 108 will be forced to climb on the periphery of the now stationary gear 109. This will cause a rotation of the spindle 106 within the housing provided by the common gear 105, and the pinion 107 will thus be caused to rotate within the housing in the direction of the arrowhead shown in connection with the gear 107. Since, however, the gear ratio between 108 and 109 is larger than unity while that between 107 and 110 is less than unity, and since the rotation of the gears 108 and 107 is determined by the gear ratio between 108 and 109, which is fixed, the result will be that the gear 107 cannot turn fast enough to climb on the periphery of the gear 110 without rotating the latter. The result is, therefore, that 110 will be caused to rotate slowly in the direction of the arrow 126. The rotation of this shaft can take place, although it requires that the friction of the yokes 120 and 121 upon the friction disk 115 be overcome. It is on account of this friction furthermore that the initial rotation of the cross-arm 114 and the shaft 110 takes place without causing a corresponding rotation of the friction disk 115. After the tension of the spring 116 becomes great enough, or, if need be, after the stop pin 118 is engaged by the cross-arm, the disk 115 will be forced to rotate. This operation will continue until the shaft 113 of the machine is brought to a stop.

When the machine stops the following operation immediately ensues: First, the common wheel or gear 105 is brought to a standstill. At that time the crank arm 103 is in its left-hand position in engagement with the stop pin 125. We have also the friction disk 115 clamped against easy rotation by the tension of the rather stiff spring 123. The spring 116 is, however, under tension, and the upper end of the cross-arm as shown in Fig. 9 is in engagement with the stop pin 118. The immediate result is, of course, for the spring 116 to pull the cross-arm 114 back into its mid position with respect to the friction disk 115. This backward rotation of the cross-arm is, of course, transmitted through the shaft 111 to the gear 110, the rotation of the gear 107 being in the direction of the arrow appearing upon that gear. This will cause a slight rotation of the gear 108 in the same direction, and since at this time the common gear 105 is stationary this will in turn cause a backward rotation of the gear 109—that is, a slight rotation in a direction opposite to that indicated by the arrow upon the shaft 104. The result of this slight backward rotation which ensues whenever the shaft 113 comes to a stop serves to disconnect the motor spring 100 and return it to the middle position indicated in the drawing.

If the machine of which the shaft 113 is a part or attachment be rotated in the direction opposite to that indicated by the arrow upon this shaft, the operation will be the same as that already described, except that it will be in a reverse direction at each stage; that is to say, the switch spring 100 will be thrown to the right instead of to the left, while the machine is in operation, and upon the stoppage of the machine the arm 103 will return from its right-hand position to its middle position due to the holding of the friction disk 115, while the spring 117 acts to retract the cross-arm 114 to its middle position between the stop pins 118 and 119. It will be noted that the outside contact springs 101 and 102 are connected in parallel, so that the circuit of the switch is closed when the motor spring 100 is thrown either to the left or the right, corresponding with the forward or backward running of the shaft 113, as the case may be.

The running switch as above described provides a means automatically to change the wage rate of a machine from an occupied rate to a higher running rate without any attention or thought on the part of the machine operator, foreman, superintendent or anyone else. It is merely necessary for the accountant upon the best information at hand to determine what the machine rates should be. Thereafter the foreman or superintendent has merely to plug the machine into a jack assigned to the job upon which the machine is at work, and thereafter the operation of the machine will of itself take care of the matter of the rate to be charged.

Fig. 10 shows in elevation the peripheries of a series of numeral wheels well adapted for use in the various registers of the system herein disclosed. The point of interest in connection with this figure is the filling in of the zeros in black or color. I have found it of great convenience in setting these registers at their zero position to have the zeros in the form of solid black ovals or circles, as indicated in this figure. When the register is in its zero position there will be a solid row of black dots or ovals in the line of sight, and I have found such a solid line of ovals coming into view when the zero position is reached to be of material assistance in the rapid return of the numeral wheels or registers at their zero positions. It will be apparent that the workmen's wage registers and the registers temporarily assigned to the cost accounting of any particular job will for purposes of convenience be returned to zero from time to time, as in the case of the wage registers at the end of a pay-roll period and in the case of job registers when the job to which they are temporarily assigned is completed. These registers may be returned to the zero position by hand either forwardly or backwardly or by special devices not shown in the drawings of this application. The filling in solid of the zeros upon the numeral wheels will aid in this resetting operation unless it be accomplished wholly automatically and without any attention on the part of the operator.

It must be clear from this description that my invention provides for a rather comprehensive system of production cost accounting. The details of the various mechanisms employed can, of course, be worked out in widely variant ways. I have not attempted to advert to every possible modification or deviation from the mechanisms herein disclosed, nor, indeed, have I endeavored to elaborate to any great extent upon the detailed construction of the mechanisms and devices employed. Many of them, as for example, spring jacks and plugs, have been well worked out in the telephone art; many other details have been worked out in connection with this art of automatic cost accounting; but, more important still, it would, I think, detract from the clearness with which the system of my present invention as a whole can be presented to enter into all of the refinements of the mechanical design of the various parts of the mechanism. With this in view, it will be understood that I have not attempted to illustrate nor mention in the description every check and caution against break-down or false operation which might well be incorporated into a commercial machine. I have, however, explained the system in such detail that a skilled constructor in this or closely allied arts would have no difficulty in building a complete and successful system. I do not, however, wish to be limited to the precise details herein shown or described. My invention involves, I think, several new principles, and discloses a mode of applying each such principle, and it is in this aspect of my invention that—

What I claim as new and desire to secure by Letters Patent is:

1. In an automatic accounting system, the combination of a plurality of burden actuating devices, means for connecting one or more of said burden actuating devices with a common burden receiving member, means for determining the normal rates of actuation of the burden actuating devices, and means governed by the burden receiving device for governing the rate of the burden actuating devices.

2. In an automatic accounting system, the combination of a plurality of wage circuits, a burden circuit associated with each wage circuit, means for supplying electric energy to said burden circuit, a total burden register with which a plurality of said burden circuits may be connected, an accruing burden register, and automatic means governed jointly by said accruing burden register and said total burden register for controlling the rate at which energy is supplied to said burden circuit.

3. In an accounting system, the combination of a plurality of register actuating circuits, an electromagnetically actuated register in each of said circuits, mechanisms for delivering current impulses at different rates, each of the actuating circuits being connected to one of said mechanisms, and automatic means for shifting the connection of the actuating circuit from one mechanism to another.

4. In an accounting system, the combination with a plurality of mechanisms for delivering current impulses at different rates, of a plurality of actuating circuits, means establishing a normal connection of each actuating circuit with one of said mechanisms, a differential gear, means for driving one side of said differential gear at a predetermined steady rate in one direction, an electromagnetic mechanism adapted to drive the other side of said differential gear in the reverse direction, means for connecting any number of said actuating circuits with said electromagnetic driving mechanism, and means controlled by the common gear of said differential gear to shift the connections of said actuating circuits from mechanisms of lower rates to mechanisms of higher rates or vice versa.

5. In an accounting system, the combination with a plurality of mechanisms for delivering current impulses at different rates, of a plurality of actuating circuits, means establishing a normal connection of each actuating circuit with one of said mechanisms, a differential gear, means for driving one side of said differential gear at a predetermined steady rate in one direction, an electromagnetic mechanism adapted to drive the other side of said differential gear in the reverse direction, means for connecting any number of said actuating circuits with said electromagnetic driving mechanism, means controlled by the common gear of said differential gear to shift the connections of said actuating circuit from a mechanism of lower rate to a mechanism of higher rate or vice versa, and adjustable stops for limiting the extent to which the connections of the actuating circuits may be shifted to mechanisms of rates higher or lower than the normal.

6. In an accounting system, the combination with a plurality of mechanisms for delivering current impulses at different rates, of a plurality of actuating circuits, means establishing a normal connection of each actuating circuit with one of said mechanisms, a differential gear, means for driving one side of said differential gear at a predetermined steady rate in one direction, an electromagnetic mechanism adapted to drive the other side of said differential gear in the reverse direction, means for connecting any number of said actuating circuits with said electromagnetic driving mechanism, means controlled by the common gear of said differential gear to shift the connections of said actuating circuit from a mechanism of lower rate to a mechanism energy of higher rate or vice versa, adjustable stops for limiting the extent to which the connections of the actuating circuits may be shifted to mechanisms of rates higher or lower than the normal, and an indicator to show the extent to which the connections of the actuating circuits are shifted from the normal.

7. In an accounting system, the combination with a plurality of mechanisms for delivering current impulses at different rates, of a plurality of actuating circuits, means establishing a normal connection of each actuating circuit with one of said mechanisms, a differential gear, means for driving one side of said differential gear at a predetermined steady rate in one direction, an electromagnetic mechanism adapted to drive the other side of said differential gear in the reverse direction, means for connecting any number of said actuating circuits with said electromagnetic driving mechanism, means controlled by the common gear of said differential gear to shift the connections of said actuating circuits from mechanisms of lower rates to mechanisms of higher rates or vice versa, and an indicator to show the extent to which the connections of the actuating circuits are shifted from the normal.

8. In an accounting system, the combination with a plurality of mechanisms for delivering current impulses at different rates, of a plurality of actuating circuits, means establishing a normal connection of each actuating circuit with one of said mechanisms, a differential gear, means for driving one side of said differential gear at a predetermined steady rate in one direction, an electromagnetic mechanism adapted to drive the other side of said differential gear in the reverse direction, means for connecting any number of said actuating circuits with said electromagnetic driving mechanism, means controlled by the common gear of said differential gear to shift the connections of said actuating circuits from mechanisms of lower rates to sources of electric energy of higher rates or vice versa, adjustable stops for limiting the extent to which the connections of the actuating circuits may be shifted to mechanisms of rates higher or lower than the normal, and means for storing the motion otherwise delivered to said differential gear when one of said stops is acting to prevent the shifting of the connections of the actuating circuit by the common wheel of the differential.

9. In an accounting system, the combination with a plurality of mechanisms for delivering current impulses at different rates, of a plurality of actuating circuits, means establishing a normal connection of each actuating circuit with one of said mechanisms, a differential gear, means for driving one side of said differential gear at a predetermined steady rate in one direction, an electromagnetic mechanism adapted to drive the other side of said differential gear in the reverse direction, means for connecting any number of said actuating circuits with said electromagnetic driving mechanism, means controlled by the common gear of said differential gear to shift the connections of said actuating circuit from a mechanism of lower rate to a mechanism of higher rate or vice versa, adjustable stops for limiting the extent to which the connections of the actuating circuits may be shifted to mechanisms of rates higher or lower than the normal, an indicator to show the extent to which the connections of the actuating circuits are shifted from the normal, and means for storing the motion otherwise delivered to the said differential gear when one of said stops is acting to prevent the shifting of the connections of the actuating circuit by the common wheel of the differential.

10. In an accounting system, the combination with a plurality of mechanisms for delivering current impulses at different rates, of a plurality of actuating circuits, means establishing a normal connection of each actuating circuit with one of said mechanisms, a differential gear, means for driving one side of said differential gear at a predetermined steady rate in one direction, an electromagnetic mechanism adapted to drive the other side of said differential gear in the reverse direction, means for connecting any number of said actuating circuits with said electromagnetic driving mechanism, means controlled by the common gear of said differential gear to shift the connections of said actuating circuits from mechanisms of lower rates to mechanisms of higher rates or vice versa, adjustable stops for limiting the extent to which the connections of the actuating circuits may be shifted to mechanisms of rates higher or lower than the normal, means for storing the motion otherwise delivered to said differential gear when one of said stops is acting to prevent the shifting of the connections of the actuating circuit by the common wheel of the differential, and manually operable means for locking said storing means against discharge.

11. In an accounting system, the combination with a plurality of mechanisms for delivering current impulses at different rates, of a plurality of actuating circuits, means establishing a normal connection of each actuating circuit with one of said mechanisms, a differential gear, means for driving one side of said differential gear at a predetermined steady rate in one direction, an electromagnetic mechanism adapted to drive the other side of said differential gear in the reverse direction, means for connecting any number of said actuating circuits with said electromagnetic driving mechanism, means controlled by the common gear of said differential gear to shift the connections of said actuating circuit from a mechanism of lower rate to a mechanism of higher rate or vice versa, adjustable stops for limiting the extent to which the connections of the actuating circuits may be shifted to mechanisms of rates higher or lower than the normal, an indicator to show the extent to which the connections of the actuating circuits are shifted from the normal, means for storing the motion otherwise delivered to the said differential gear when one of said stops is acting to prevent the shifting of the connections of the actuating circuit by the common wheel of the differential, and manually operable means for locking said storing means against discharge.

12. In an accounting system, a plurality of actuating circuits, to which each actuating circuit is connected at one end, a connecting terminal at the other end of each actuating circuit, a plurality of electromagnetically actuated registers, a register circuit in which each electromagnetically actuated register is included, each such circuit having a terminal for the reception of the connecting terminal of an actuating circuit, and means independent of the terminal of the register circuit for connecting and thus electrically associating with any one connecting terminal of an actuating circuit, the connecting terminal of any other actuating circuit or circuits.

13. In an accounting system, an actuating circuit, mechanism for delivering current impulses of given rate to which said circuit is connected at one end, an electromagnetic job-cost register with which the actuating circuit is connected at the other end, and a machine switch adapted automatically upon the running of the machine with which it is connected to increase the rate of the current impulses supplied to said actuating circuit.

14. In an accounting system, the combination of an indicating register, an actuating mechanism for said register, means for periodically operating said actuating mechanism, means for varying the rate of operation of said actuating mechanism, means for confining the number of actuations of said register for a given time interval between predetermined limits, and means for storing the potential actuations of positive or negative sign which are outside of said limits.

15. In an accounting system, the combination of an indicating register, an actuating mechanism for said register, means for operating said actuating mechanism, means for limiting the number of actuations of said register during a given time integral between predetermined limits, means for storing the potential actuations of positive or negative sign outside of said limits, and means for transferring said potential actuations to said actuating mechanism when the actuations of said register are within said limits.

16. In an accounting system, a source of power, an indicating register, an actuating mechanism for said register, means connecting said actuating mechanism with said source of power, means for varying said connection to cause a corresponding variation in the number of actuations of said register in a predetermined length of time, means for limiting the amount of actuation of said register during a predetermined interval, means for storing the potential actuations outside of said limit, and means for transforming said potential into actual actuations when the connection between said actuating mechanism and said source causes the actuations of said register to be within the predetermined limit.

17. In an accounting system, a source of dynamic impulses, an indicating register, an actuating mechanism for said register, means connecting said actuating mechanism with said source of impulses, means for limiting the number of impulses passing to said actuating mechanism in a predetermined time interval, and means for storing the impulses from said source which are outside of said limit.

18. In an accounting system, a source of dynamic impulses, an indicating register, an actuating mechanism for said register, means connecting said actuating mechanism with said source of impulses, means for limiting the number of impulses passing to said actuating mechanism in a predetermined time interval, means for storing the impulses from said source which are outside of said limit, and means for transferring said stored impulses to said actuating mechanism when the actuations of said register for a given time interval are within said limit.

19. In an accounting system, the combination of a burden register, an actuating mechanism for said register, means for varying the actuations of said register according to the amount of burden to be distributed, means for confining the number of actuations of said register for a given time interval within predetermined limits, and means for storing the potential actuations of positive or negative sign which are outside of said limits.

20. In an accounting system, the combination of a source of electric impulses, an indicating register, an electromagnetic actuating mechanism for said register, means connecting said actuating mechanism with said source of impulses, means for limiting the number of impulses which are allowed to pass to said actuating mechanism in a predetermined length of time, means for storing the impulses from said source which are outside of said limits, and means for transferring said impulses from said storing means to said actuating mechanism when the number of actuations of said register is within said predetermined limits.

21. In an accounting system, a source of dynamic impulses, a plurality of indicating registers, an actuating mechanism for each of said registers, means connecting said actuating mechanisms with said source of impulses, means for automatically varying the number of impulses flowing to said actuating mechanisms in a given time interval according to a predetermined sum to be distributed, means for limiting the number of actuations passing to said actuating mechanism during said interval, and means for storing the impulses which are outside of said limits.

22. In an accounting system, a source of dynamic impulses, a plurality of indicating registers, an actuating mechanism for each of said registers, means connecting said actuating mechanisms with said source of impulses, means for automatically varying the number of impulses flowing to said actuating mechanisms in a given time interval according to a predetermined sum to be distributed, means for limiting the number of actuations passing to said actuating mechanisms during said interval, means for storing the impulses which are outside of said limits, and means for transferring said stored impulses to the actuating mechanisms when the normal actuations of said actuating mechanisms for a given time interval are within the predetermined limits.

23. In an accounting system, a source of dynamic impulses, a plurality of burden registers, an actuating mechanism for each of said registers, means connecting each of said actuating mechanisms with said source of impulses, means for varying the actuations of said burden registers according to the amount of burden to be distributed, means for limiting the number of impulses passing to said actuating mechanisms in a given time, means for storing the impulses outside of said predetermined limits, and means for automatically transferring said impulses from said storing means to the actuating mechanisms when the number of normal actuations of said actuating mechanisms is within the predetermined limits.

24. In an accounting system, the combination of a source of power, a wage register, a burden register, an actuating mechanism for each of said registers, means connecting each actuating mechanism with said source of power, means for varying the actuations of said burden register according to the amount of burden to be distributed, means for limiting the number of actuations of said burden register in a predetermined time, means for storing the potential actuations outside of said limited number, and means for transforming said potential into actual actuations of said burden register when the number of normal actuations of said register is within the predetermined limit.

25. In an accounting system, the combination of a source of dynamic impulses, a wage register, a burden register, an actuating mechanism for each of said registers, means connecting said actuating mechanisms with said source of impulses, means for varying the number of actuations of said burden register according to the amount of burden to be distributed, means for limiting the number of actuations passing in a given time interval to the actuating mechanism of said burden register, means for storing the impulses which are thus prevented from passing to the actuating mechanism of the burden register, and means for transferring said impulses from the storing means to the actuating mechanism when the number of normal actuations of the burden register for a given time interval is within the predetermined limit.

26. In an accounting system, the combination with a source of electric impulses, of a wage register, a burden register, an electromagnetic actuating mechanism for each of said registers, means connecting said actuating mechanisms with said source of impulses, means for varying the number of actuations of said burden register according to the amount of burden to be distributed, means for limiting the number of actuations passing in a given time interval to the actuating mechanism of said burden register, means for storing the impulses which are thus prevented from passing to the actuating mechanism of the burden register, and means for transferring said impulses from the storing means to the actuating mechanism when the number of normal actuations of the burden register for a given time interval is within the predetermined limit.

27. In an accounting system, the combination with a source of dynamic impulses, of a plurality of wage registers, a plurality of burden registers, an actuating mechanism for each of said registers, means connecting said actuating mechanisms with said source of impulses, means for varying the number of impulses passing to said burden registers according to the amount of burden to be distributed, means for limiting the number of impulses passing in a given time interval to the actuating mechanisms of said burden registers, means for permitting the passage of actuations only between predetermined maximum and minimum limits, means for storing the impulses of positive or negative sign thus prevented from passing to said actuating mechanisms, and means for transferring said impulses from said storing means to said actuating mechanisms when the number of normal actuations of said actuating means for a given time interval is within said predetermined limits.

28. In an accounting system, the combination of a source of electric impulses, a plurality of wage registers, a plurality of burden registers, an electromagnetic actuating mechanism for each of said registers, means connecting each of said actuating mechanisms with said source of impulses, means for varying the number of impulses passing to the actuating mechanisms of said burden registers according to the amount of burden to be distributed, means for limiting the number of impulses passing to said actuating mechanisms in a given time within predetermined maximum and minimum limits, means for storing the impulses in excess of or less than the number of impulses between said limits, and means for transferring said impulses from said storing means to said actuating mechanisms when the number of normal actuations of said actuating mechanisms is within said predetermined limits.

29. In an accounting system, the combination of a source of dynamic impulses, a job-wage register, a job-burden register, an actuating mechanism for each of said registers, means connecting said actuating mechanisms with said source of impulses, means for varying the number of actuations of said job-burden register according to the amount of burden to be distributed, means for limiting the number of impulses passing in a given time interval to said job-burden register to a predetermined maximum or minimum, means for storing the impulses from said source which are outside of said predetermined maximum and minimum number, and means for transferring said stored impulses to the actuating mechanism of said job-burden register when the number of normal actuations of said job-burden register for a given time interval is within the predetermined maximum and minimum limits.

30. In an accounting system, a source of electric impulses, a job-wage register, a job-burden register, an actuating mechanism for each of said registers, means connecting each of said actuating mechanisms with said source of impulses, means for varying the number of impulses which pass to the actuating mechanism of said job-burden register according to the amount of burden to be distributed, means for preventing the passage of a number of impulses in a given time which are outside of a predetermined maximum and minimum, means for storing the impulses which are outside of said limits, and means for transferring said impulses from said storing means to the actuating mechanism of said job-burden register.

31. In an accounting system, the combination of a plurality of job-wage registers, a plurality of job-burden registers, a source of dynamic impulses, an actuating mechanism for each of said registers, means connecting each of said actuating mechanisms with said source of impulses, means for varying the number of impulses passing to the actuating mechanisms of the job-burden registers according to the total amount of burden to be distributed, means for limiting the number of impulses passing in a given time interval to said burden registers, means for storing the impulses which are outside of said limit, means for transferring the impulses thus stored to the actuating mechanisms of the job-burden registers when the number of normal actuations of said job-burden registers for a given time interval are within the predetermined limit, a total job-wage register, and a total job-burden register.

32. In an accounting system, the combination of a plurality of job-wage registers, a plurality of job-burden registers, a source of electric impulses, an electromagnetic actuating mechanism for each of said registers, means connecting each of said actuating mechanisms with said source of impulses, means for varying the number of impulses passing to the actuating mechanisms of the job-burden registers according to the total amount of burden to be distributed, means for limiting the number of impulses passing in a given time interval to said burden registers, means for storing the impulses which are outside of said limit, means for transferring the impulses thus stored to the actuating mechanisms of the job-burden registers when the number of normal actuations of said job-burden registers for a given time interval are within the predetermined limit, a total job-wage register, and a total job-burden register.

33. In an accounting system, a burden register, an actuating mechanism for said register, a source of power, means connecting said actuating mechanism with said source of power, a burden mechanism actuated at a rate proportional to the burden to be distributed, and means for regulating the connection of said actuating mechanism with said source of power according to the rate of actuation of said burden mechanism.

34. In an accounting system, a source of dynamic impulses, a burden register, an actuating mechanism for said register, means connecting said actuating mechanism with said source of impulses, a burden mechanism actuated at a rate proportional to the amount of burden to be distributed, and means for regulating the connection between said actuating mechanism and the source of impulses according to the rate of actuation of the burden mechanism.

35. In an accounting system, the combination of a source of electric impulses, a burden register, an electromagnetic actuating mechanism for said register, means connecting said actuating mechanism with said source of impulses, a burden mechanism actuated at a rate proportional to the amount of burden to be distributed, and means for regulating the connection between said actuating mechanism and said source of impulses according to the rate of actuation of the burden mechanism.

36. In an accounting system, the combination of power devices, a wage register, a burden register, an actuating mechanism for each of said registers, means connecting said actuating mechanism with said power devices, a burden mechanism actuated at a rate proportional to the amount of burden to be distributed, and means for regulating the connection of the actuating mechanism of the burden register with said power devices according to the rate of actuation of the burden mechanism.

37. In an accounting system, the combination of means for producing electric impulses, a wage register, a burden register, an electromagnetic actuating mechanism for each of said registers, means connecting each of said actuating mechanisms with said means for producing impulses, a burden mechanism actuated at a rate proportional to the amount of burden to be distributed, and means for regulating the connection of the actuating mechanism of said burden register with said means for producing impulses according to the rate of actuation of said burden mechanism.

38. In an accounting system, the combination of a source of power, a burden register, an actuating mechanism for said register, means connecting said actuating mechanism with the source of power, a burden mechanism actuated at a rate proportional to the amount of burden to be distributed, means for regulating the connection of said actuating mechanism with said source of power according to the rate of actuation of the burden mechanism, and means for confining the rate of actuation of the burden register within a predetermined limit.

39. In an accounting system, the combination of a source of power, a burden register, an actuating mechanism for said register, means connecting said actuating mechanism with the source of power, a burden mechanism actuated at a rate proportional to the amount of burden to be distributed, means for regulating the connection of said actuating mechanism with said source of power according to the rate of actuation of the burden mechanism, and means for confining the rate of actuation of the burden register within predetermined maximum and minimum limits.

40. In an accounting system, the combination of a source of electric impulses, a burden register, an electromagnetic actuating mechanism for said register, means connecting said actuating mechanism with said source of impulses, a burden mechanism actuated at a rate proportional to the amount of burden to be distributed, and a switch for regulating the connection of the actuating mechanism with said source of impulses to cause the equalization of the distributed burden with the burden to be distributed.

41. In an accounting system, the combination of a source of electric impulses, a burden register, an electromagnetic actuating mechanism for said register, means connecting said actuating mechanism with said source of impulses, a burden mechanism actuated at a rate proportional to the amount of burden to be distributed, a mechanism actuated at a rate proportional to the amount of distributed burden, and means for automatically equalizing the amount of burden distributed with the amount of burden to be distributed.

42. In an accounting system, the combination of a source of electric impulses, a burden register, an electromagnetic actuating mechanism for said register, means connecting said actuating mechanism with said source of impulses, a burden mechanism actuated at a rate proportional to the amount of burden to be distributed, a differential gear, one side of which is actuated by said burden mechanism and the other side of which is actuated at a rate corresponding with the amount of distributed burden, and a switch for regulating connection between the actuating mechanism of said burden register and the source of impulses so that the opposite sides of the differential gear will be actuated at the same rate.

43. In an accounting system, the combination of a source of power, a plurality of burden registers, an actuating mechanism for each of said registers, means connecting each of said actuating mechanisms with said source of power, a burden mechanism actuated at a rate proportional to the amount of burden to be distributed, and means for regulating the connection of said actuating mechanisms with said source of power according to the rate of actuation of said burden mechanism.

44. In an accounting system, the combination of a source of power, a plurality of burden registers, an actuating mechanism for each of said registers, means connecting each of said actuating mechanisms with said source of power, a burden mechanism actuated at a rate proportional to the amount of burden to be distributed, and means for automatically equalizing the distributed burden with the burden to be distributed.

45. In an accounting system, the combination of a source of power, a plurality of burden registers, an actuating mechanism for each of said registers, means connecting each of said actuating mechanisms with said source of power, a burden mechanism actuated at a rate proportional to the amount of burden to be distributed, means for totalizing the actuation of said burden registers, and means for equalizing the actuations of said burden mechanism and the total actuations of said burden registers.

46. In an accounting system, the combination of a source of dynamic impulses, a plurality of burden registers, an actuating mechanism for each of said registers, means connecting each of said actuating mechanisms with said source of impulses, a burden mechanism actuated at a rate proportional to the amount of burden to be distributed, means for totalizing the actuations of said burden registers, and means for equalizing the total actuations of said burden registers with the actuations of said burden mechanism.

47. In an accounting system, the combination of a source of electric impulses, a plurality of burden registers, an electromagnetic actuating mechanism for each of said registers, means connecting each of said actuating mechanisms with said source of impulses, a burden mechanism actuated at a rate proportional to the amount of burden to be distributed, means for totalizing the actuations of said burden registers, and means for automatically regulating the connection of said burden registers with said source of impulses to equalize the total actuations of said burden register with the actuations of said burden mechanism.

48. In an accounting system, the combination with a source of power, of a plurality of burden registers, an actuating mechanism for each of said registers, means connecting said actuating mechanism with said source of power, a burden mechanism actuated at a rate proportional to the amount of burden to be distributed, means for totalizing the actuations of said burden registers, a differential gear actuated by said burden mechanism and the totalizing means of said burden registers, and means operated by said differential gear for equalizing the total actuations of said burden registers with the actuations of said burden mechanism.

49. In an accounting system, the combination with a source of dynamic impulses, of a plurality of burden registers, an actuating mechanism for each of said registers, means connecting the said actuating mechanisms with said source of impulses, a burden mechanism actuated at a rate proportional to the amount of burden to be distributed, means for totalizing the actuations of said burden registers, a differential gear actuated by said burden mechanism and the totalizing means of said burden registers, means actuated by said differential gear for regulating the connection of the actuating mechanisms of said burden registers with said source of impulses to cause the equalization of the total actuations of said burden registers with the actuations of said burden mechanism, and means for limiting the total actuations of said burden registers.

50. In an accounting system, the combination of a source of electric impulses, a plurality of burden registers, an electromagnetic actuating mechanism for each of said registers, means connecting said actuating mechanisms with said source of impulses, a burden mechanism actuated at a rate proportional to the amount of burden to be distributed, means for totalizing the actuations of said burden registers, a differential gear actuated by said burden mechanism and the totalizing means of said burden registers, means operated by said differential gear for automatically regulating the connections of said actuating mechanisms with said source of impulses to cause the equalization of the total actuations of said burden registers with the actuations of said burden mechanism, and means for limiting the total actuations of said burden registers for a given interval of time.

51. In an accounting system, the combination of a source of power, a burden register, an actuating mechanism for said register, means connecting said actuating mechanism with said source of power, a burden mechanism actuated at a rate proportional to the amount of burden to be distributed, means for automatically varying the connection of said actuating mechanism with the source of power to equalize the actuations of said register with said burden mechanism, means for limiting the rate of actuation of said burden register, and means for storing the actuations of said burden mechanism outside of the predetermined limit of the rate of actuation of said register.

52. In an accounting system, the combination of a source of power, a burden register, an actuating mechanism for said register, means connecting said actuating mechanism with said source of power, a burden mechanism actuated at a rate proportional to the amount of burden to be distributed, means for automatically varying the connection of said actuating mechanism with the source of power to equalize the actuations of said register with said burden mechanism, means for limiting the rate of actuation of said burden register, means for storing the actuations of said burden mechanism outside of the predetermined limit of the rate of actuation of said register, and means for transferring said stored actuations to the burden register when the actuations of said register are within the predetermined limit.

53. In an accounting system, the combination of a source of dynamic impulses, a burden register, an actuating mechanism for said register, means connecting said actuating mechanism with said source of impulses, a burden mechanism actuated at a rate proportional to the amount of burden to be distributed, means for regulating the connection of the actuating mechanism with the source of impulses to cause an equalization of the actuations of the burden register with the actuations of the burden mechanism, means for limiting the rate of actuations of said burden register, and means for storing the actuations of said burden mechanism at a rate outside of the limit of the rate of actuations of said burden register.

54. In an accounting system, the combination of a source of dynamic impulses, a burden register, an actuating mechanism for said register, means connecting said actuating mechanism with said source of impulses, a burden mechanism actuated at a rate proportional to the amount of burden to be distributed, means for regulating the connection of the actuating mechanism with the source of impulses to cause an equalization of the actuations of the burden register with the actuations of the burden mechanism, means for limiting the rate of actuations of said burden register, means for storing the actuations of said burden mechanism at a rate outside of the limit of the rate of actuations of said burden register, and means for transferring said actuations from the storing means to the burden register when the actuations of said register are at a rate within said predetermined limit.

55. In an accounting system, the combination of a source of power, a plurality of burden registers, an actuating mechanism for each of said registers, means connecting said actuating mechanisms with said source of power, a burden mechanism actuated at a rate proportional to the amount of burden to be distributed, means for totalizing the actuations of said burden registers, means for equalizing the total actuations of said burden registers with the actuations of said burden mechanism, and means for varying the rates of actuations of the burden registers having a relatively high rate of actuation to a greater extent than the burden registers having a relatively low rate of actuation.

56. In an accounting system, the combination of a source of electric impulses, a plurality of burden registers, an electromagnetic actuating mechanism for each of said registers, means connecting each of said actuating mechanisms with said source of impulses, a burden mechanism actuated at a rate proportional to the amount of burden to be distributed, means for totalizing the actuations of said burden registers, means for regulating the connection of the burden registers with said source of impulses so that the total actuations of said registers will equal the actuations of said burden mechanism, and means for changing the rates of actuation of the burden registers having a relatively high rate of actuation to a greater extent than the burden registers having a relatively low rate of actuation.

57. In an accounting system, the combination of a source of electric impulses, a plurality of burden registers, an electromagnetic actuating mechanism for each of said registers, means connecting said actuating mechanisms with said source of impulses, a burden mechanism actuated at a rate proportional to the amount of burden to be distributed, means for totalizing the actuations of said burden registers, a differential gear actuated by said burden mechanism and the totalizing means of said burden registers, and means operated by said differential gear for regulating the connections of the actuating mechanisms of said burden registers with said source of impulses so that the rate of the total actuations of the burden registers will equal the rate of actuation of the burden mechanism, the changes of rate of the burden registers having a relatively high rate of actuation being greater than the changes of rate of the burden registers having a relatively low rate of actuation.

58. In an accounting system, the combination of a source of electric impulses, a plurality of burden registers, an electromagnetic actuating mechanism for each of said registers, means connecting each of said actuating mechanisms with said source of impulses, a burden mechanism actuated at a rate proportional to the amount of burden to be distributed, means for totalizing the actuations of said burden registers, a differential gear actuated by the totalizing means of said burden registers and the burden mechanisms, a switch controlling the connections of the actuating mechanisms of said burden registers with said source of impulses, and means operated by said differential gear for moving said switch to cause the equalization of the total actuations of said burden registers with the actuations of said burden mechanism, said switch having a plurality of contacts to cause a greater proportionate change in the rate of actuation of the registers having a relatively high rate of actuation than the registers having a relatively low rate of actuation.

59. In an accounting system, a burden distributing switch comprising a member having a plurality of terminals, said terminals being connected with a plurality of sources of electric impulses, and a movable member having contacts adapted to form electrical connection with said terminals, the movement of said contact member adapted to shift said contacts from terminals connected with sources of impulses having one set of rates to terminals connected with sources of impulses having a second set of rates.

60. In an accounting system, a burden distributing switch comprising a member having a plurality of terminals, said terminals being formed into groups by the connection of an unequal number of terminals with a plurality of conductors, and a second movable member having a plurality of contacts adapted to form electrical connection with said terminals of the first member, movement of said second member serving to shift the connection of said contacts with the groups having a lesser number of terminals while retaining the connection with the groups having a greater number of terminals.

61. In an accounting system, a burden distributing switch comprising a member having a plurality of terminals, said terminals being formed into groups by the connection of an unequal number of terminals with a plurality of conductors, a second movable member having a plurality of contacts adapted to form electrical connection with said terminals of the first member, movement of said second member serving to shift the connection of said contacts with the groups having a lesser number of terminals while retaining the connection with the groups having a greater number of terminals, and means for limiting the movement of said second member.

62. In an accounting system, a burden mechanism having a member adapted to be actuated at a predetermined rate, a second member adapted for actuation, means for operatively connecting said second member with said first member to cause actuation between variable limits of the second member at a desired proportion of the rate of actuation of said first member, a register for indicating the proportional connection between said first and second members, and a register for indicating the actuations of said second member.

63. In an accounting system, a burden mechanism comprising a member adapted to be rotated at a predetermined rate, a second rotatable member, means for operatively connecting said first and second members, a register for indicating the amount of burden to be distributed, and means for simultaneously setting up a predetermined amount in said register and operating said connecting means.

64. In an accounting system, a burden mechanism comprising a member adapted to be rotated at a predetermined rate, a second rotatable member, means for operatively connecting said first and second members, a register for indicating the amount of burden to be distributed, means for simultaneously setting up a predetermined amount in said register and operating said connecting means, and a register for indicating the actuations of said second member.

65. In an accounting system, a burden mechanism comprising a shaft adapted to be rotated at a predetermined velocity, a second shaft, a plurality of differential mechanisms mounted on said second shaft and adapted for connection with said first shaft in a plurality of operating ratios, means for selectively establishing the connection of said differential mechanisms with said first shaft, a member adapted to be rotated by the combined action of said differential mechanisms, a register for indicating the connection of the selected differential mechanisms with said first shaft, and a second register for indicating the rotation of said second member.

66. In an accounting system, a burden register comprising a shaft rotatable at a predetermined speed, a plurality of gears in mesh with each other and operated by said shaft at a plurality of velocities, a plurality of differential gears, a worm gear in mesh with each of said gears, a clutch for connecting each of said worm gears with a corresponding gear operated by said first shaft, means for selectively operating said clutches, and a shaft rotated by said differential gears at a velocity proportional to the combined velocities of said differential gears.

67. In an accounting system, a burden register comprising a shaft rotatable at a predetermined speed, a plurality of gears in mesh with each other and operated by said shaft at a plurality of velocities, a plurality of differential gears, a worm gear in mesh with each of said gears, a clutch for connecting each of said worm gears with a corresponding gear operated by said first shaft, means for selectively operating said clutches, a shaft rotated by said differential gears at a veloctity proportional to the combined velocities of said differential gears, and a register for indicating which of the differential gears are operatively connected with the gears actuated by said first shaft.

68. In an accounting system, a burden register comprising a shaft rotatable at a predetermined speed, a plurality of gears in mesh with each other and operated by said shaft at a plurality of velocities, a plurality of differential gears, a worm gear in mesh with each of said gears, a clutch for connecting each of said worm gears with a corresponding gear operated by said first shaft, means for selectively operating said clutches, a shaft rotated by said differential gears at a velocity proportional to the combined velocities of said differential gears, a register for indicating which of the differential gears are operatively connected with the gears actuated by said first shaft, and a second register for indicating the actuations of said second shaft.

69. In an accounting system, a burden mechanism comprising a shaft rotatable at a predetermined speed, a plurality of differential gears connected with each other, a gear mounted on said first shaft, a crown gear in mesh with the gear on said shaft, a plurality of gears in mesh with each other and connected to said crown gear, said connected gears being actuated at a plurality of speeds, means for connecting each of said differential mechanisms with one of said gears, a second crown gear associated with one of said connected gears, a second gear mounted on said shaft, means for disengaging the first gear on said shaft from its corresponding crown gear and engaging the second gear on said shaft with said second crown gear, thereby changing the speeds of all of the connected gears, and a second shaft actuated by the combined operation of said differential gears.

70. In an accounting system, a burden mechanism comprising a shaft rotatable at a predetermined speed, a plurality of differential gears connected with each other, a gear mounted on said first shaft, a crown gear in mesh with the gear on said shaft, a plurality of gears in mesh with each other and connected to said crown gear, said connected gears being actuated at a plurality of speeds, means for connecting each of said differential mechanisms with one of said gears, a second crown gear associated with one of said connected gears, a second gear mounted on said shaft, means for disengaging the first gear on said shaft from its corresponding crown gear and engaging the second gear on said shaft with said second crown gear, thereby changing the speeds of all of the connected gears, means for retaining the connection between said first gear on said shaft and said first crown gear or said second gear on said shaft and said second crown gear, and a second shaft actuated by the combined operation of said differential gears.

71. In an accounting system, a burden mechanism comprising a shaft rotatable at a predetermined speed, a second connected shaft longitudinally movable with respect to said first shaft, means for retaining said second shaft in a selected position, a third shaft, and means for operatively connecting said third shaft with said second shaft to cause any desired proportion of the speed of said second shaft to be transferred to said third shaft.

72. In an accounting system, a burden register comprising a main shaft rotatable at a predetermined velocity, an extension shaft connected with said main shaft and longitudinally movable with respect thereto, said extension shaft having a plurality of annular grooves in its periphery, a retaining member adapted to engage a selected groove and thereby retain said extension shaft in its selected position, a third rotatable shaft, and means for operatively and selectively connecting said third shaft with said extension shaft to cause rotation of said third shaft at any desired proportion of the velocity of rotation of said extension shaft.

73. In an accounting system, a burden mechanism comprising a main shaft rotatable at a predetermined speed, an extension shaft connected with said main shaft and longitudinally movable with respect thereto, means for retaining said extension shaft in any predetermined position, a plurality of gears on said extension shaft, a plurality of differential gears connected with each other, a speed gear associated with each of said differential gears, said speed gears being operatively connected with each other to rotate at different speeds, a plurality of crown gears associated with said speed gears, means for selectively engaging any one of said crown gears with a corresponding gear on said extension shaft, means for selectively connecting any of said differential gears with the corresponding speed gears, and a third shaft actuated by the combined operation of said differential gears.

74. In an accounting system, a burden mechanism comprising a shaft rotatable at a predetermined velocity, a plurality of differential gears, a second shaft adapted to be actuated by said gears, a clutch associated with each of said differential gears, and a plurality of disks, each disk associated with one of said clutches, the periphery of each disk having portions of unequal radius, said portions of the disks being so disposed with relation to each other that the disks may be rotated to operate any desired combination of said clutches.

75. In an accounting system, a burden mechanism comprising a shaft rotatable at a predetermined speed, a plurality of differential gears adapted to be operatively connected with said shaft, a clutch associated with each of said differential gears, the operation of said clutch serving to establish connection between its associated differential gear and said shaft, a second shaft rotated by said differential gears, a third shaft, and a plurality of disks mounted on said third shaft, each of said disks associated with one of said clutches and having portions of its periphery of unequal radius, said disks being so disposed on said shaft that by rotation of said shaft the portions of the peripheries of said disks of greater radius may be caused to operate any selected combination of said clutches.

76. In an accounting system, a burden mechanism comprising a shaft rotatable at a predetermined speed, a plurality of differential gears adapted to be operatively connected with said shaft, a clutch associated with each of said differential gears, the operation of said clutch serving to establish connection between its associated differential gear and said shaft, a second shaft rotated by said differential gears, a third shaft, a plurality of disks mounted on said third shaft, each of said disks associated with one of said clutches and having portions of its periphery of unequal radius, said disks being so disposed on said shaft that by rotation of said shaft the portions of the peripheries of said disks of greater radius may be caused to operate any selected combination of said clutches, and a register for indicating the clutches which are thus operated.

77. In an accounting system, a burden mechanism comprising a shaft rotatable at a predetermined velocity, a plurality of differential gears adapted to be operatively connected with said shaft, a clutch associated with each of said differential gears for establishing connection between said gears and said shaft, a lever for operating each of said clutches, a disk associated with each of said levers, said disks having peripheries with portions of unequal radius, the portions of greater radius adapted to operate said levers to actuate said clutches, and a shaft on which said disks are mounted so that the portions of unequal radius of said disks are so disposed that any desired combination of clutches may be actuated.

78. In an accounting system, a burden mechanism comprising a shaft rotatable at a predetermined speed, a plurality of variable ratio differenetial gears adapted for connection with said shaft at different speed ratios, means for selectively connecting any desired combination of said differential gears with said shaft, and a second shaft actuated by said differential gears.

79. In an accounting system, a burden mechanism comprising a shaft rotatable at a predetermined speed, a train of differential gears operatively connected with each other, means for connecting said differential gears with said shaft at a plurality of speed ratios, a setting shaft, and a plurality of cams on the setting shaft, one of said cams being associated with each differential gear, the cams being so disposed on said setting shaft that on rotation of the shaft any desired combination of differential gears may be connected with said first shaft.

80. In an accounting system, a burden mechanism comprising a shaft adapted to be rotated at a predetermined velocity, a second shaft, a plurality of differential mechanisms mounted on said second shaft to communicate motion thereto from said first shaft and each of said differential mechanisms having a different ratio of transmission between the shaft, and devices for changing the ratio of transmission of each differential mechanism.

81. In an accounting system, a burden mechanism comprising a driving element, a driven element, a plurality of trains of gearing between said elements each adapted to drive the driven element at a predetermined rate relatively to the driving element, and means for changing the driving ratio of each of said trains of gearing.

82. In an accounting system, a burden mechanism comprising a driving element, a driven element, a plurality of trains of gearing between said elements each adapted to drive the driven element at a predetermined rate relatively to the driving element, and a device for shifting the gear connections to establish any one of predetermined driving ratios for each of said trains of gearing.

83. In an accounting system, a burden mechanism comprising a driving member, a driven member, a plurality of differential mechanism each having a predetermined driving ratio, devices for establishing operative connection between the driving member and the driven member through desired ones of the differential mechanisms, said differential mechanisms related so that operatively connected ones thereof combine their driving ratios into a resultant ratio between the driving and driven members, and devices for changing the individual driving ratio of one of said differential mechanisms.

84. In an accounting system, a burden mechanism comprising a driving member, a driven member, a plurality of differential mechanism each having a predetermined driving ratio, devices for establishing operative connection between the driving member and the driven member through desired ones of the differential mechanisms, said differential mechanisms related so that operatively connected ones thereof combine their driving ratios into a resultant ratio between the driving and driven members, and mechanism for simultaneously changing the value of all of the individual driving ratios of the differential mechanisms.

85. In an accounting system, a burden register comprising a driving shaft, a driven shaft, variable ratio differential gearing between said shafts, a register, and a manually operable member for actuating said register and establishing a ratio of said differential gearing corresponding to the reading of said register.

86. In an accounting system, a burden register comprising a driving shaft, a driven shaft, variable ratio differential gearing between said shafts, a register, a manually operable member for actuating said register and establishing a ratio of said differential gearing corresponding to the reading of said register, and devices for changing said gear ratio to a multiple of the reading of said register.

87. In an accounting system, the combination of a burden register comprising a driving shaft, a driven shaft, variable ratio differential gearing between said shafts, a register, a manually operable member for actuating said register, and mechanism operated by said member for establishing a ratio of said differential gearing corresponding to the reading of said register.

88. In an accounting system, the combination of a burden register comprising a driving shaft, a driven shaft, variable ratio differential gearing between said shafts, a register, a manually operable member for actuating said register and clutches operated by said member for establishing a ratio of said differential gearing corresponding to the reading of said register.

In witness whereof I hereunto subscribe my name this 29th day of December, A. D. 1909.

FREDERICK O. HEUSER.

Witnesses:
HENRY M. HUXLEY,
J. S. ABBOTT.

Copies of this patent may be obtained for five cents each, by addressing the "Commissioner of Patents, Washington, D. C."